(12) United States Patent
Cherradi El Fadili

(10) Patent No.: US 10,209,881 B2
(45) Date of Patent: Feb. 19, 2019

(54) EXTENDING THE FREE FINGERS TYPING TECHNOLOGY AND INTRODUCING THE FINGER TAPS LANGUAGE TECHNOLOGY

(76) Inventor: Ibrahim Farid Cherradi El Fadili, Vienna (AT)

( * ) Notice: Subject to any disclaimer, the term of this patent is extended or adjusted under 35 U.S.C. 154(b) by 0 days.

(21) Appl. No.: 14/383,921

(22) PCT Filed: Mar. 15, 2012

(86) PCT No.: PCT/EP2012/054622
§ 371 (c)(1),
(2), (4) Date: Sep. 9, 2014

(87) PCT Pub. No.: WO2013/135299
PCT Pub. Date: Sep. 19, 2013

(65) Prior Publication Data
US 2015/0084884 A1    Mar. 26, 2015

(51) Int. Cl.
*G06F 3/0488* (2013.01)
*G06F 3/041* (2006.01)
*G06F 3/01* (2006.01)
*G06F 3/023* (2006.01)
*G06F 3/03* (2006.01)
*G06F 3/042* (2006.01)

(52) U.S. Cl.
CPC .......... *G06F 3/04883* (2013.01); *G06F 3/017* (2013.01); *G06F 3/0233* (2013.01); *G06F 3/0304* (2013.01); *G06F 3/041* (2013.01); *G06F 3/0425* (2013.01)

(58) Field of Classification Search
None
See application file for complete search history.

(56) References Cited

U.S. PATENT DOCUMENTS

| | | | |
|---|---|---|---|
| 2002/0024500 A1* | 2/2002 | Howard | G06F 3/014 345/158 |
| 2003/0132950 A1* | 7/2003 | Surucu | G06F 1/1626 715/700 |
| 2007/0076862 A1* | 4/2007 | Chatterjee | G06F 17/276 379/433.06 |
| 2009/0322673 A1* | 12/2009 | Cherradi El Fadili | G06F 3/017 345/157 |
| 2015/0261429 A1* | 9/2015 | Ghassabian | G06F 3/0482 715/773 |

* cited by examiner

*Primary Examiner* — Jason Olson
*Assistant Examiner* — Krishna Neupane

(57) ABSTRACT

The user taps with free fingers on a surface, the finger-taps are organized in groups of simultaneously occurring taps called combinations of concurrent finger-taps. Successions of combinations of one or more concurrent finger-taps are executed. To distinguish between two successive combinations of simultaneous finger-taps, the user produces them separated by short time intervals. A sensing device detects finger-taps; their location and time of occurrence are acquired. The fingers producing the taps are identified. Combinations of fingers producing concurrent taps are associated to linguistic primitives like phonemes or morphemes. Series of linguistic primitives are converted to vocal speech; this method is called Finger Taps Language Technology.

12 Claims, 13 Drawing Sheets

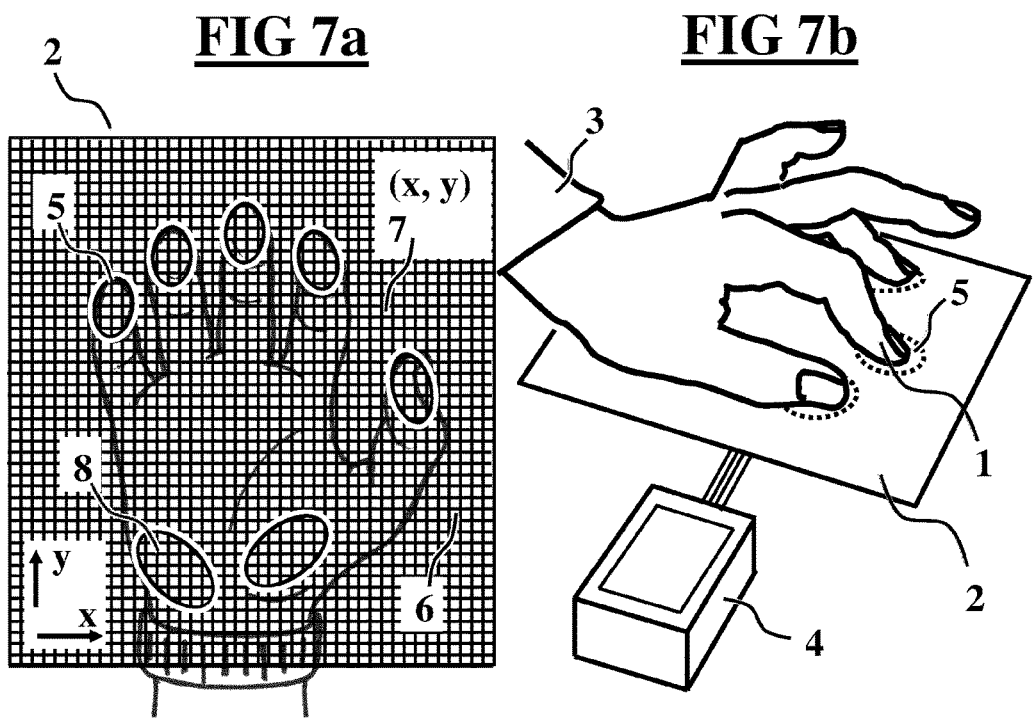
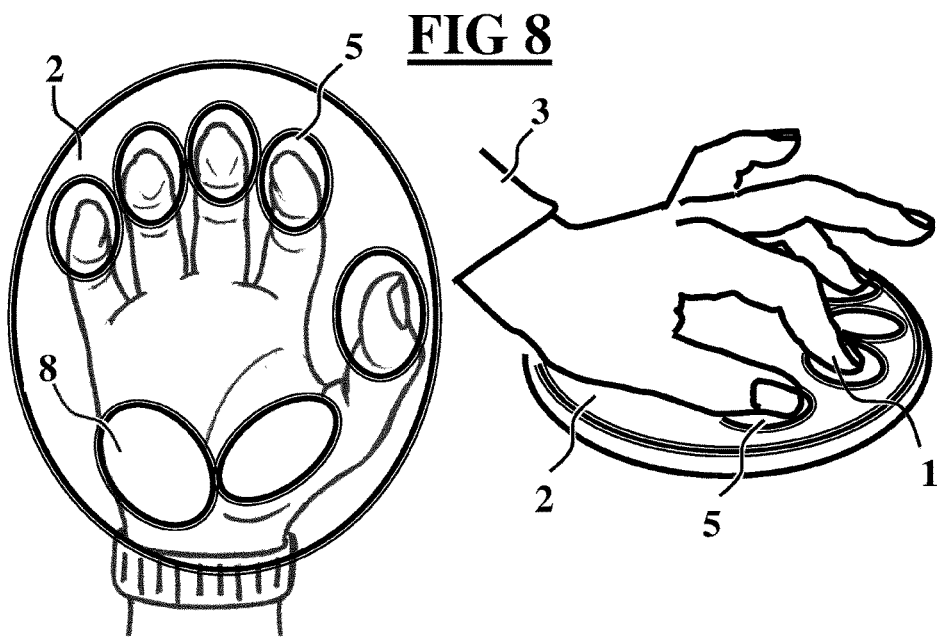

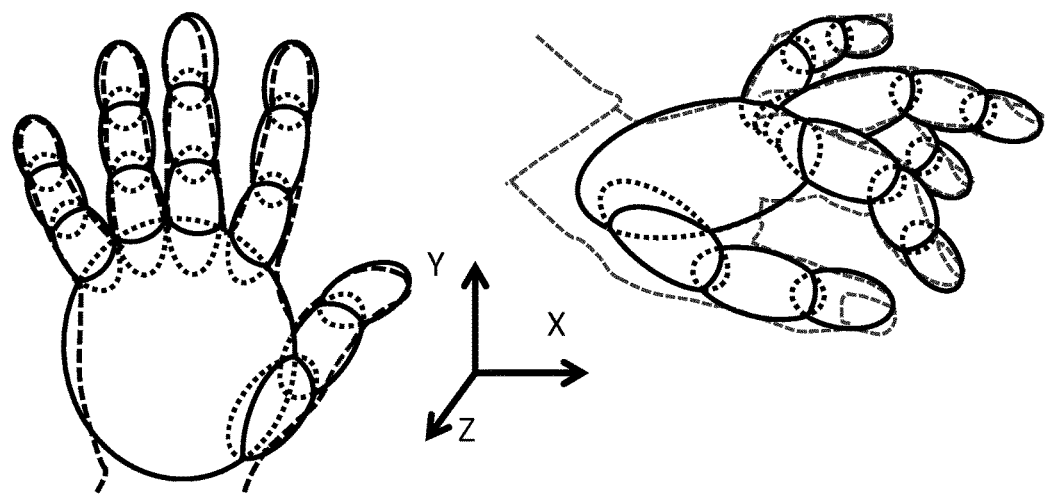
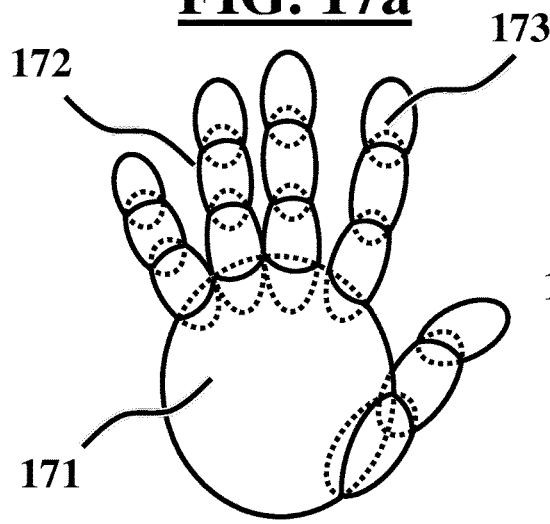
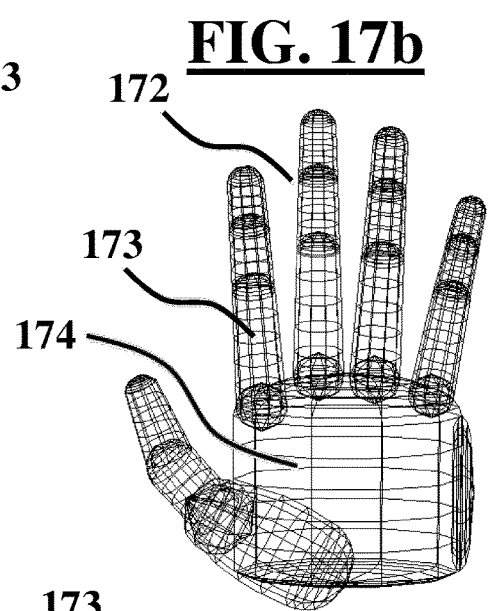
FIG. 17a
FIG. 17b
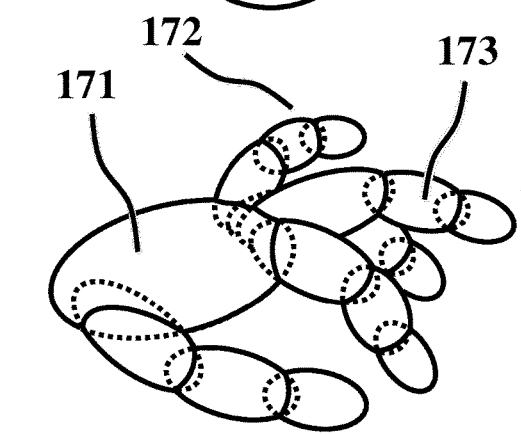
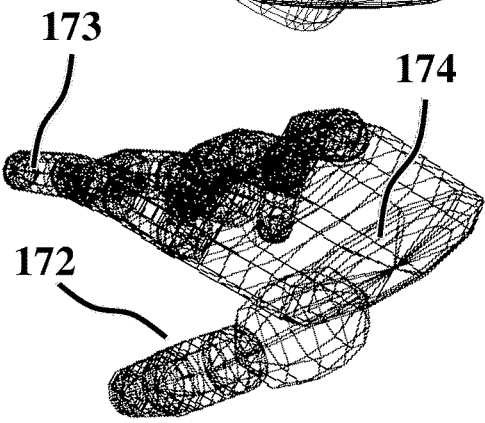

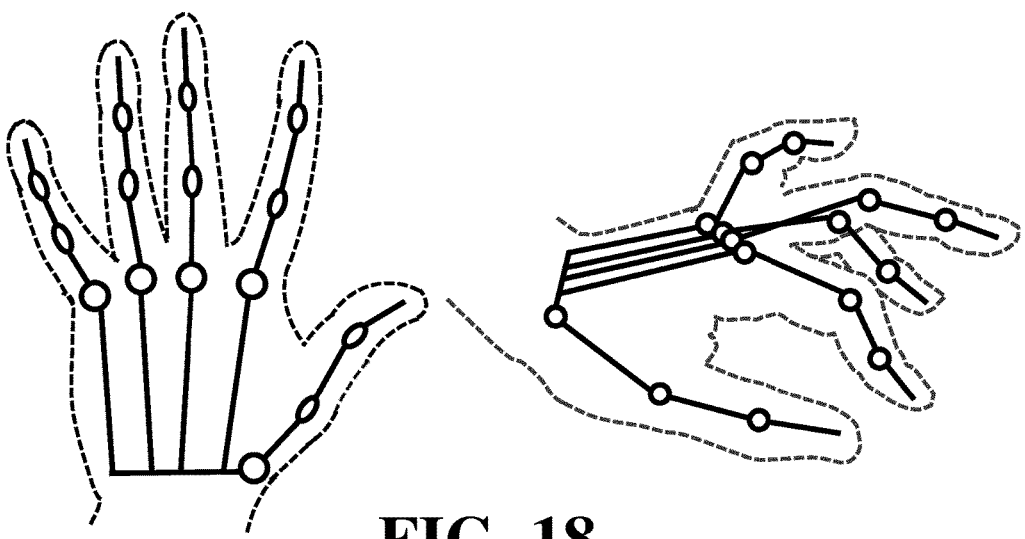
FIG. 18
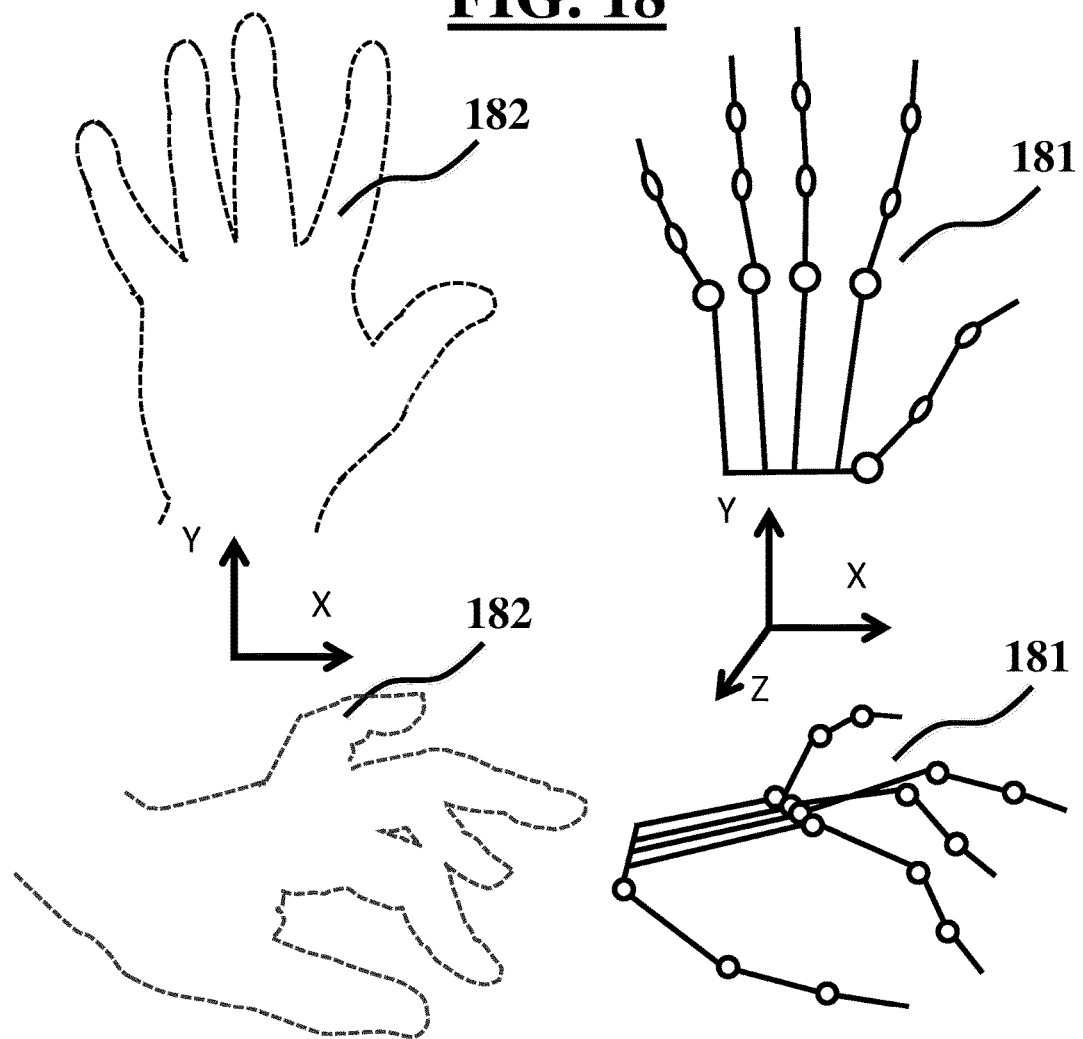

EXTENDING THE FREE FINGERS TYPING TECHNOLOGY AND INTRODUCING THE FINGER TAPS LANGUAGE TECHNOLOGY

RELATED PATENT DOCUMENTS

PCT/IB2006/052425-EP2041640-US 20090322673 A1 FREE FINGERS TYPING TECHNOLOGY—Ibrahim Farid CHERRADI EL FADILI

ABBREVIATIONS, DEFINITIONS AND SYNONYMS

FFTT=Free Fingers Typing Technology.
FTLT=Finger Taps Language Technology.
Combination of concurrent finger-taps=group of finger-taps happening at the same time=group of finger-tap events all happening within a same pre-set short time interval=group of time-correlated finger-taps. In this context the following terms are used interchangeably: combination=group=burst;
concurrent=simultaneous=happening at the same time=time-correlated; finger-tap=finger-tap event=tap.
Train of combination of finger-taps=succession of groups of concurrent finger-taps separated by a brief time pause. In this context the following terms are used interchangeably: succession=series=sequence=train=chaplet.
Information Processing Device=computer (e.g. desktop, notebook, tablet, pad, Pocket Personal Computer, etc.), mobile phone, smart phone, Personal Digital Assistant (PDA), photo/video camera, gaming device, musical equipment, other human controllable machine or device etc. . . .
FFTT Commands=user commands comprising Keyboard Commands, Linguistic Primitives, Machine Commands, other commands or functions etc. . . .
Keyboard Command=pushing a computer keyboard key, moving a pointer/selector, pushing a pointing/selecting device button (clicking), pushing a key of a music instrument keyboard, pushing a key of a machine command keyboard etc. . . .
Pointing/selecting device=device such as a mouse, joystick, or controller allowing to manipulate, on a display of an Information Processing Device virtual objects such as characters, buttons, or graphic objects by pointing to, selecting, actuating, checking or moving (dragging, dropping) objects.
Pointer/selector=cursor or graphics indicator of a pointing/selecting device visible on the display of an Information Processing Device.
Language Primitive=basic language element such as Phonemes and Morphemes.
FFTT sensing device=appropriate instrumentation used to assist FFTT in detecting finger-taps also called FFTT finger-tap sensing device or FFTT sensor. The role of such device is to acquire and transfer, to FFTT software relevant information (including data related to location and time of occurrence of finger-taps) that allows FFTT to detect finger-taps and identify the fingers that produced them.
FFTT apparatus=an apparatus with FFTT capabilities; i.e. an apparatus that is able to perform all FFTT tasks including recognition of combinations of concurrent finger-taps and the execution of their associated FFTT Commands. Such apparatus is obviously able to run FFTT software and is commonly designated as apparatus 'with FFTT inside'. Examples of devices that can be 'with FFTT inside' and therefore be an FFTT apparatus are computer, PDA, game console, mobile phone, smart phone, photo/video camera, music instrument or other similar devices.

FFTT finger-spot=a virtual area under each finger on the tapping surface localized around the position of the finger on the tapping surface whit the hand in pianist position laying comfortably on the surface with all its fingers. A 'bean-shape' area to a few cm2 and of a width more or less equal to the average distance between two fingers.
CV=Computer vision.
SLI=Structured Light Illumination.

SUMMARY OF THE INVENTION

The present invention provides the main elements and the essential description of the Extended Free Fingers Typing Technology. The user taps with free fingers on a surface. The hands and fingers are in the pianist position and produce finger-taps organized in groups of simultaneously occurring taps called combinations of concurrent fingers-taps. Successions of groups of one or more concurrent finger-taps are executed. FFTT makes use of a device called FFTT sensing device able to help FFTT system to sense finger-taps and to recognize which fingers produced the taps. Based on appropriate technology FFTT sensing device helps FFTT acquire the data related to the occurrence of each finger-tap event including the location and the time of occurrence. In order for FFTT system to distinguish between two successive combinations of simultaneous finger-taps, the user produces them separated by short time laps. To the detected combinations of concurrent taps are associated codes that are converted to FFTT Commands comprising Keyboard Commands, Linguistic Phonemes or Morphemes, Machine Commands and other commands or functions. FFTT system executes these generated FFTT Commands locally or remotely by sending related information (with wired or wireless connection) to an Information Processing Device for further processing. An apparatus that is able to perform all these tasks is said apparatus with FFTT capabilities and called FFTT apparatus. Such apparatus is commonly designated as apparatus 'with FFTT inside'.

FFTT is a ubiquitous technology that can be deployed anywhere and everywhere; it makes use of various means and different solutions to sense the finger-taps and identify the fingers that produced them. FFTT can be equally implemented with Computer Vision techniques, with haptic touch sensing techniques, with acoustic sensing techniques, or with other suitable techniques capable of sensing multiple taps produced simultaneously on a surface by the fingers free from any instrumentation. The invention provides at least one methodology to execute the finger-taps and at least one convention to code the finger-taps combinations and a multitude of examples of FFTT sensing devices in association with a multitude of technologies able to help FFTT detect the finger-taps and convert them to FFTT Commands. FFTT process includes five main steps: detecting the finger-taps, identifying the fingers producing the finger-taps, sorting detected finger-taps in series of groups of one or more concurrent finger-taps, converting groups of concurrent finger-taps into FFTT Commands and executing the generated FFTT Commands. When FFTT is used for text typing, the user taps with his bare fingers on any surface, without looking at them and without predefined location of the surface to produce series of combinations of simultaneous finger-taps that are converted to keyboard characters or key strokes for an Information Processing Device. Anyone can easily learn to 'tap-to-type' it is simpler to learn than learning to type on a conventional keyboard without looking; also tapping-to-type is faster and more intuitive than conventional keyboard typing. When FFTT is used to create sign languages it is called Finger Taps Language Technology (FTLT). Also in FTLT the user taps with his bare fingers on any surface to produce series of combinations of concurrent finger-taps that are converted to finger-taps language primitives such as phonemes and morphemes executed following the vocabulary, the syntax and the grammatical rules of the concerned finger-taps language. FTLT system has also the ability to convert series of language primitives to vocal speech.

BACKGROUND OF THE INVENTION

All over the world women and men, adults and children use daily their fingers to produce finger-pushes on all kind of keyboards, mouse or controller devices related to computers, musical instrument, game console or other controlled machines. Fingers are used to push keys on keyboards, to push machine buttons and even to push computer software graphics user interface buttons. Humans in order to communicate with machines use finger-pushes rather than finger-taps. Finger-taps and finger-pushes are different. A finger-tap is very brief while a finger-push generally lasts a certain time; the duration of a finger-push of a key or button is in general longer than the duration of finger-tap and might require applying a minimum force to actuate mechanical keys. Moreover a key-push requires a key, a button or other object or location (physical or virtual) to push, this fact is by itself a limitation of the freedom of the user as the finger needs to reach the location of the key to actuate it, whereas finger-taps are produced spontaneously and freely on any location of a surface.

Sign languages have been used extensively among speech-disabled people. People who can speak also use a variety of gestures to support their communication in particular with speech-disabled persons. However, because of their complexity the expressiveness of hand gestures has not been fully explored for Human-Computer Interaction (HCI). Combinations of simultaneous finger-taps can carry rich information and are fully exploitable by computers. Finger-taps are not intrusive and more convenient for users to interact with computers. Finger-taps can be used in a wide range of applications related to HCI and in particular for effective recognition of sign languages by computers. In order to solve the problem of gesture recognition, a number of researchers choose to work on partitioning the hand gesture into basic elements or primitives that constitute the gesture. Among the difficulties facing such research work are:
  the actual determination and characterization of hand gesture primitives,
  the reproducibility of the gesture primitives produced by different users and in different environments,
  the hand gestures even if they are well characterized and made reproducible they constitute a language vocabulary that is not rich enough and not large enough to ensure full interaction in related applications, and
  the larger the hand gesture language vocabulary becomes the slower the execution of the gestures and therefore the slower the interaction becomes.

These break-to-conquer-approaches attempting to characterize hand gestures correspond to top-to-bottom approaches in the sense that they start from complex hand gestures and try to break them in simple primitive gestures; the chance of success of their exploration is however limited. Extended FFTT by introducing FTLT (Finger Taps Language Technology) provides a new and innovative bottom-to-top approach that starts from finger-taps corresponding to real basic elements or primitives gestures to build a new concept of sign language and a new concept of HCI. Extended FFTT solves the problems related to the top-to-bottom approaches described above; the introduction of FTLT presents the following advantages:
  Finger-taps are perfectly characterized and identifiable by appropriate FFTT sensing devices and related technologies.
  Finger-taps are perfectly reproducible with different users and in different environments.
  Finger-taps created by up to 10 fingers can produce virtually an unlimited number of successions of combinations that can be used to generate a language with a vocabulary large enough and rich enough (there is theatrically no limit) to ensure full interaction in most related applications; and
  Finger-tap combinations can be executed very fast, faster than other known sign languages.

BRIEF DESCRIPTION OF THE DRAWINGS

FIG. 7a and FIG. 7b show a touch sensor surface of an area large enough for at least one hand with appropriate electronics.

FIG. 8 illustrates fingers switches, one for each finger and for the palm, used to detect finger-taps and palm touch.

FIG. 17a and FIG. 17b illustrates two different 3D articulated hand models.

FIG. 18 shows a 3D skeletal model of the hand and fingers.

WHAT IS FFTT INVENTION?

What is Claimed in this Invention?

Figure 1A:
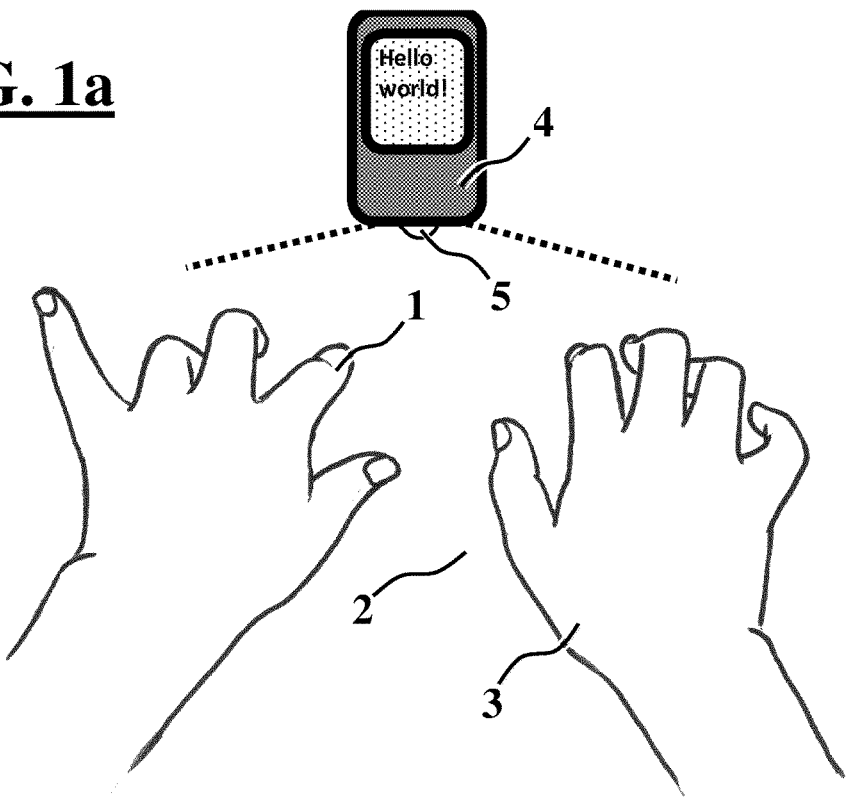
FIG. 1a and FIG. 1b show a top view and a side view of the user hands tapping on the surface in front of an external CV based FFTT apparatus in stand-alone mode.
Figure 1B:
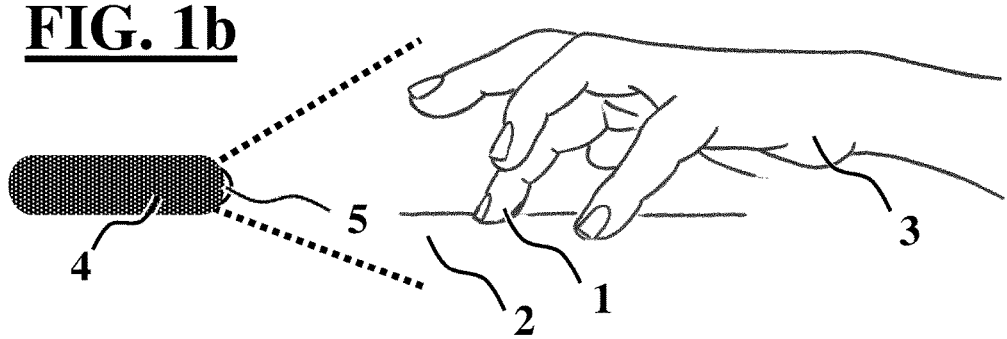
Figure 1C:
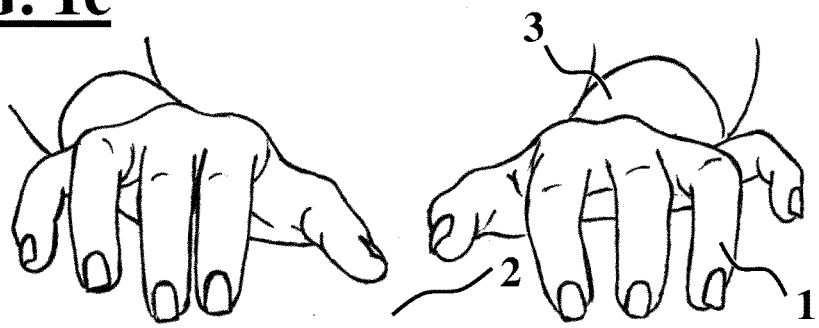
FIG. 1c shows a front view of the user hands tapping on the surface.
Figure 2A:
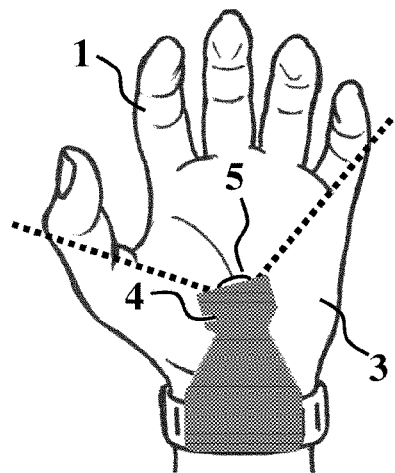
FIG. 2a and FIG. 2b show a bottom view and a side view of an example of watch-pad CV based FFTT apparatus.
Figure 3A:
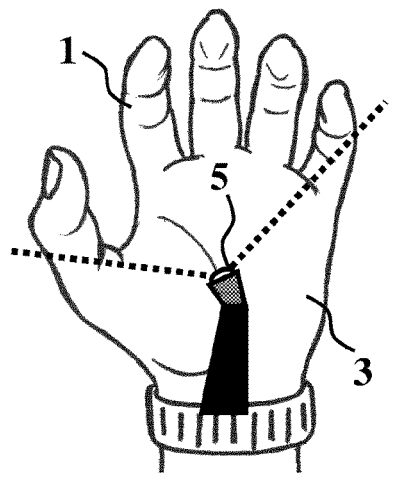
FIG. 3a and FIG. 3b show a bottom view and a side view of an example of a watch-sensor CV based FFTT apparatus.
Figure 2B:
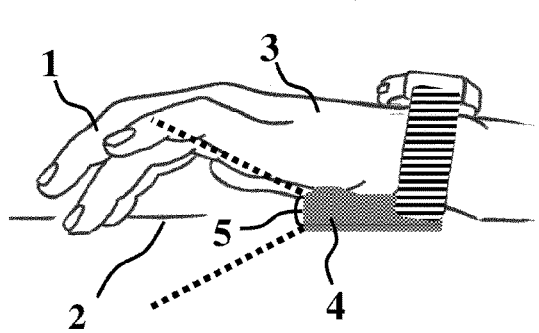
Figure 3B:
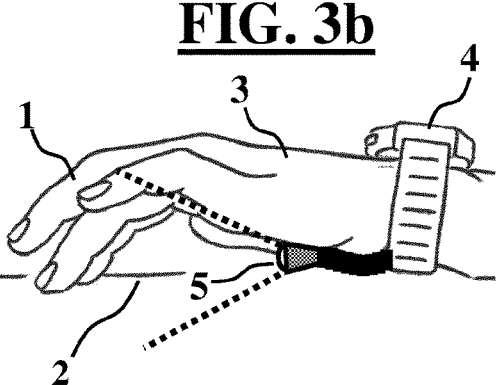
Figure 4:
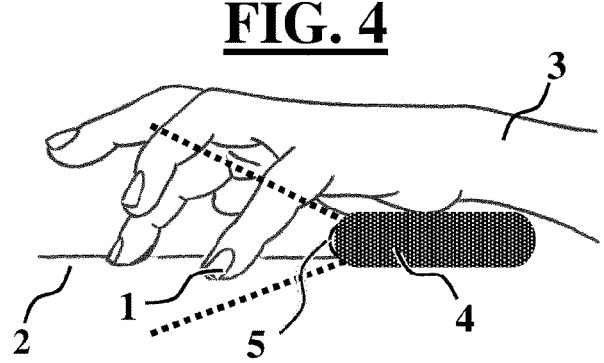
FIG. 4 shows a side view of a wrist-pad CV based FFTT apparatus.
Figure 5:
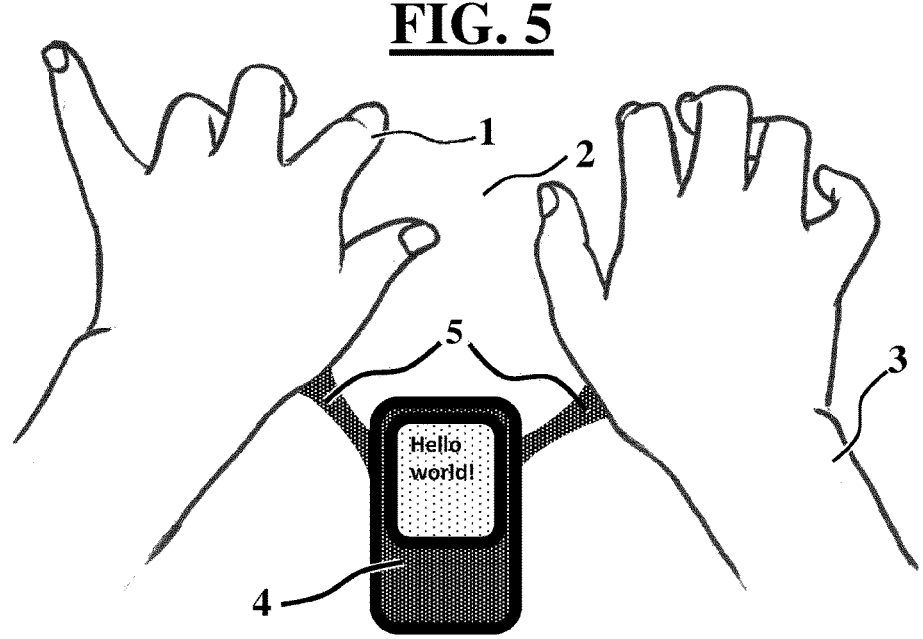
FIG. 5 shows a top view of a CV based external FFTT apparatus using a sensor with antennas reaching inside the hands.

FFTT was first introduced in the description of the patent application {PCT IB2006/052425-EP2041640-US 20090322673 A1—FREE FINGERS TYPING TECHNOLOGY}. Extended FFTT generalises FFTT and introduces FTLT. The generalisation of FFTT is motivated by the necessity to avoid any situation where a third party claims as new invention the concept of FFTT in association with another means to detect taps on a surface. The present description demonstrates that the problem of detecting concurrent taps produced on a surface with fingers free from any instrumentation and identifying the fingers that produced them is totally solved by various means. Specific details and examples are set forth in order to provide a thorough understanding of the extended Free Fingers Tapping Technology. These details are provided for purposes of explanation, the scope of FFTT invention should not be considered as limited to these detailed examples. It will be apparent to one skilled in the art that FFTT may be practiced in other embodiments that depart from these specific details. On the other hand in certain instances, detailed descriptions of well-known or conventional techniques, hardware components, software specifications and so forth are omitted on as to not obscure the description with unnecessary details. The objective of this section is to describe in simple text what is actually claimed in FFTT invention. Conscious of the fact that in general patent descriptions are often difficult to decipher for nonprofessional readers, it might be useful to describe here clearly what FFTT is (and what it is not) and what is claimed. This description contain deliberately a number of sections that might appear as multiple repetitions or include multiple synonyms; these sections are in fact not total repetitions or redundancies they include variations that are motivated by the need to cover other possible aspects, nuances and terminologies of the notions they describe.

FFTT is a 'non-keyboard' invention; this means that it is an invention that is not based on the principle of keyboards. That is to say the basis of FFTT methodology does not consist of actuating keys to generate commands like it is the case for keyboards where the finger has to move to a predefined location to actuate the key. It is important to clarify that conventional or non-conventional keyboards use mechanical, optical or other means to actuate the keys. For example a virtual optical keyboard can use optical emitters and optical sensors such as those that function on the principle of light emitted and reflected by a finger to a sensor; if the location from which the beam is reflected by a finger coincides with a predefined location, the key is considered as closed or actuated. FFTT is not based on such type of keyboards or on any other device based on keyboard concept. Furthermore, in FFTT a combination of concurrent finger-taps is not equivalent to a chord of keys in a keyboard (Ctrl-Alt-Del for example). FFTT is not an invention based on combination of keys in a computer keyboard or a combination of keys in a stenographic keyboard or other type of keyboards. FFTT is even less an invention based on keyboard with small numbers of keys, FFTT is not based on a combinatorial keyboard or on a keyer or on keypad type device where actuating a key or a group of keys simultaneously generates a code that is further translated in a command.

FFTT invention is not based on surface swiping gestures: In some existing methods, gestures of the fingers moving on a surface are recognized and interpreted into commands. There are for example methods where combinations of fingertips swipe the surface to produce predefined movements or gestures, and each of these movements on the surface correspond to a command constituting a dictionary of commands. In this type of methods the fingers stay in contact with the surface for a relatively large period of time while they are executing their gestures. FFTT is different from these methods since in FFTT the fingers produce concurrent taps events that last a very short laps of time; and during the brief laps of time when the fingertips are in contact with the surface they do not need to move (do not slide on the surface). In FFTT the correlation or the common factor between the finger-taps of a same combination is the fact that they all happen at the same time and not the fact they all execute the same swiping gesture on the surface. It is important to note that these finger swiping methods cannot achieve what FFTT does because in these methods nothing happens (no command is produced) if the fingers do not swipe the surface or do not move while in contact with the surface.

FFTT is based on concurrent fingers-taps: FFTT is an invention based on free taps of the fingers on a surface, the word "free" means (1) that the fingers are free from any instrumentation and (2) that there are no predefined locations that the fingers must touch or where the fingers should move in order to produce a command. FFTT is based on detecting finger-taps events on a surface and grouping together those finger-taps that happen at the same time. Each group consists of at least one tap and of maximum 10 taps; 5 per hand. Obviously in a given group it is necessary to have at least two taps to talk about concurrent taps; while it is possible to have in the same group up to 10 concurrent taps. This illustrates the huge potential of FFTT that allows covering easily all FFTT Commands that can be imagined by presenting virtually an unlimited number of possible combinations of series of groups of time-correlated finger-taps. This is achieved of course without compromising on the speed of execution of these commands. Furthermore a group consisting of one single finger-tap is not only mathematically valid but also practical in order to code very frequently used FFTT Commands. In summary FFTT is based on detecting events and determining groups of these events that are related by a time correlation; these events are finger-taps on a surface and the time correlation is the fact that the events happen at the same time, they coincide, in practice they happen in a time window small enough that all events occurring in it are considered as concurrent.

FFTT finger-taps language called Finger Taps Language Technology (FTLT): Extended FFTT introduces a completely new sign language concept based on finger-taps called Finger Taps Language Technology. FTLT uses finger-taps as sign language primitives (such as words or syllables). FTLT opens a whole new field for linguists to create sign languages based on the idea where finger-taps are used as smallest unit of the sign language (Phonemes) or the smallest meaningful unit of the sign language (Morphemes). Making use of the framework of FTLT methodology based on combinations of time-correlated finger-taps, linguists can create new sign languages with associated vocabularies, syntaxes and grammars supported by the alphabet and symbols generation capabilities of FFTT. The power of sign languages based on FTLT resides in the fact that these languages will be fully understandable by machines. This will create totally new domains of applications in particular for speech-disabled persons and for HCI. FTLT can provide speech-disabled persons with new and powerful communication capabilities. Using FTLT methodology speech-disabled persons produce chaplets of combinations of finger-taps corresponding to the sentences or the phrases they want to say and an FFTT sensing device detects theses series of combinations of the finger-taps and converts them to language primitives in order to compose phrases that are checked for completeness and correctness by a spelling and grammatical software checker before they are converted to vocal speech sentences. Consequently it is easy to imagine applications such as the possibility for speech-disabled persons to talk orally to other persons, talk on the phone, etc.

What is claimed by FFTT? It is clear that the public domain techniques contributing in the implementation of FFTT (including FTLT) are not claimed; those technologies comprising Computer Vision techniques and associated optical sensors and illuminations as well as haptic or touch sensing techniques and associated components, acoustic sensing techniques, and other suitable sensors by themselves are not claimed. What are claimed are (1) the methodology of FFTT (including FTLT) and (2) the use of these mentioned supporting techniques and related touch sensing devices in association with FFTT methodology (including FTLT).

What is disclosed in this description? It is clear that the open source techniques allowing to carry out FFTT (including FTLT) that are described in this application are; (1) only examples of the different technologies that can implement FFTT and there are probably other technologies or other variations of these technologies that can also implement FFTT and; (2) described with a level of details that is sufficient to proof that the concerned technology is actually capable of supporting the implementation of FFTT. If necessary more details can be found in relevant specialised literature in the public domain. It is important to acknowledge the fact that for the purpose of writing this description a very large number of papers, articles, thesis and other open source documents were consulted and from them information relevant to FFTT is used in this description. This information was often vulgarized and adapted to FFTT description needs with the unique aim to prove the applicability to FFTT implementation. This adapted information is used only in the framework of this description and is not intended to be used for other purposes. Furthermore it is clear that what is disclosed from FFTT (including FTLT) invention itself is limited to the level of details that is sufficient to proof that FFTT actually works, and that other crucial details of FFTT are deliberately not disclosed since they are not necessary for the proof of principle and since revealing them could weaken the protection of FFTT intellectual property.

Advantages and benefits of FFTT: No doubt that the biggest advantage of FFTT is the freedom it offers by allowing the user to type without keyboard, play music without keyboard etc. Typing without keyboard and without looking implies fast typing, very fast typing for skilful and well trained typists. FFTT is the ideal technique for fast, intuitive and natural human to computer data input. The next advantage of FFTT is the possibility to tap-to-type freely in any situation and on any location of the surface with the fingers free from any instrumentation. This implies that with FFTT it is possible to type in total dark. FFTT presents important advantages for blind persons since it does not require placing the fingers in a specific locations or sensing with the fingers the keys of a Braille keyboard. FFTT allows blind persons to use one hand to tap-to-type and use the other hand to read simultaneously on soft cells of a Braille display the typed characters. This could be a unique and fast way for blind people to type and read simultaneously what they are typing. FTLT allows the creation and the use of totally innovative sign languages that have the advantage of being easily understandable by machines and therefore offering machine assisted vocal speech abilities to speech disabled persons.

FFTT Methodology for Executing Finger-Taps on a Surface

Figure 9:
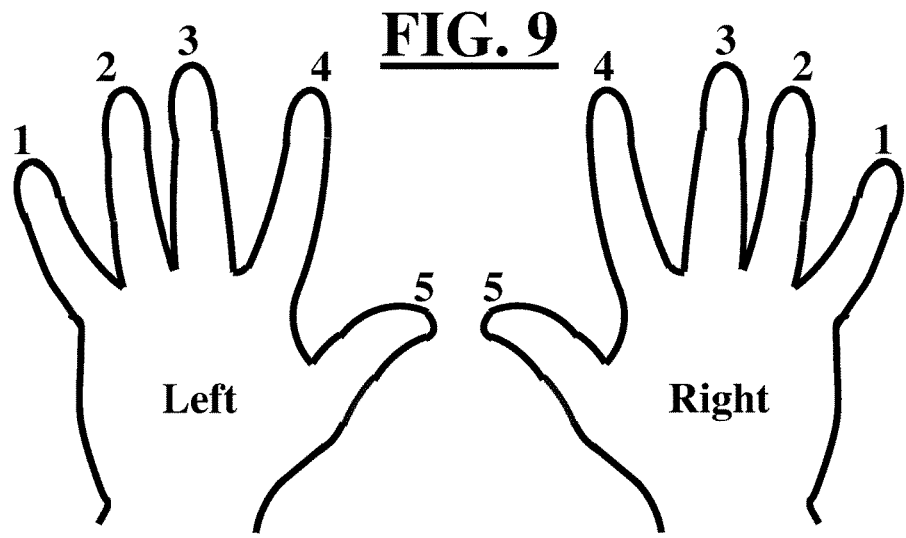
FIG. 9 represents FFTT finger numbering from 1 to 5 for the fingers of the left and right hand.

The invention provides a methodology for tapping freely on a surface with fingers free from any instrumentation with the objective to execute series of groups of concurrent finger-surface-taps that are associated to FFTT Commands. Two hands are usually used to produce finger-taps but the methodology could be adapted to one single hand. At a given instant the user can produce with both hands up to 10 simultaneous taps (5 per hand) and a minimum of 1 tap. Therefore groups of time-correlated finger-taps can include up to 10 finger-taps and a minimum of 1. It is obvious that in a given group it is necessary to have at least two finger-taps to talk about finger-taps that are occurring at the same time; however a group of one single finger-tap is not only mathematically valid but also practical to code frequently used FFTT Commands. It is important to note that, while it is mathematically possible, it is out of question to adopt the extreme method that consists of using only groups consisting of only one single finger-tap because this would obviously defeat all the strength of FFTT innovation as the time of execution of the commands would be far too long and prohibitive; it would kill all interests of FFTT. The art of FFTT finger-taps coding entails the optimisation of the number of concurrent finger-taps in the groups taking into account the ergonomics, the biological degrees of freedom of human fingers, the speed of execution, the ease of execution and, the ease of memorisation of the combinations of simultaneous finger-taps in the same group. As described below in the proposed coding tables, analysis and experience show that groups of one single finger-tap cover the 10 numerical digit characters, groups of two simultaneous finger-taps (one finger from each hand) cover 25 of 26 English characters, groups of two simultaneous finger-taps of the same hand cover other very frequently used characters and control keys, groups of three simultaneous finger-taps (one finger from one hand and two from the other) cover most of known characters and keys of a given language and groups of easily executable and easily memorisable 4 and more simultaneous finger-taps can complete or introduce variations in the coding conventions. One possible variation to the proposed coding tables below could have for example as objective to keep the maximum number simultaneous finger-taps in a combination equal to 2. This is possible by using some easily memorisable combinations of simultaneous finger-taps to open registers consisting of grouped FFTT Commands associated to combinations of maximum 2 finger-taps. This could be achieved in a toggle mode or in non-toggle mode. In toggle mode means that the easily memorisable combination of simultaneous finger-taps used to open a given register needs to be re-executed to close the register (inspired from the [CapsLock] key). In non-toggle mode mean that the easily memorisable combination of simultaneous finger-taps opens a given register but the register closes automatically after a combination from the register is executed (inspired from the [Shift] key). Referring to FIG. 9 the hand fingers are numbered from '1' to '5'; '1' is attributed to auricular finger, '2' to ring finger, '3' to middle finger, '4' to index finger and '5' to thumb finger. This represents an example of a simple and valid FFTT finger numbering used in FFTT coding convention of the finger-taps to represent FFTT Commands. The letter 'l' is used to refer to a finger of the left hand and 'r' to a finger of the right hand. Naturally these numbering conventions are only examples; there is basically no limits to the possibilities of other numbering rules that can also be used by FFTT. Following are examples of rules illustrating how finger-taps can be associated to FFTT Commands including typing printable or non-printable, alphanumeric or non-alphanumeric characters, producing control characters or pushing function keys, producing finger-taps language morphemes and phonemes etc. FFTT Commands for musical instrument are not developed in this description because they depend on the musical instrument used; however the principle of coding is similar. Examples of coding methods are summarised in a set of tables where the characters and the keyboard keys are listed together with their corresponding codes transcribing the associated finger-tap combinations. These tables are provided as non-limiting examples of FFTT coding methods; so as described in the following sections, even though they provide detailed examples of how these groups of finger-taps can be coded to represent FFTT Commands, it is obvious that other coding rules can also be used in FFTT; particularly in writing FFTT software source code.

Associating finger-tap combinations to characters and computer keyboard keys: The coding conventions described in this section were tested successfully on FFTT system prototypes.

Coding minuscule letters: to the letter 'a' is attributed simply one tap of finger '1' of the left hand (coded l1) occurring simultaneously with one tap of finger '1' of the right hand (coded r1). To this combination of concurrent finger-taps representing the letter 'a' is given the code 'l1/r1'. Then to 'b' is attributed the combination 'l1/r2' etc. . . . in alphabetical order until 'l1/r5' for 'e'. Another series for 'l2' is then started with 'l2/r1' for 'f' and so on until 'l5/r5' for 'y'. Since there is no more single fingers combinations, to 'z' is attributed simultaneous taps of fingers '1' and '5' of the right hand (coded r1-r5) while the left hand is in neutral position; the combination is then noted '/r1-r5'. Reference is made to Table 1 showing the finger-taps combinations attributed to minuscule letters resulting from this convention.

Hand in neutral position: the hand is said in neutral position when no finger touches the surface.

Hand palm in lifted position: Normally the hand palm is resting on the surface while the fingers are tapping, the fingers can also tap on the surface while the wrist is lifted so that the palm is not in contact with the surface, it is said then that the hand palm is in lifted position, referred to as lifted-palm position. Some examples of FFTT sensing devices provide a mechanism of optical, haptic, acoustic or mechanical nature to differentiate between the status of the hand when it is in contact with the surface and the status of the hand when it is not touching the surface (lifted palm position). The ability for FFTT system to differentiate between the two hand positions is very practical because it doubles, at least, the number of finger-taps combinations without adding any major complication while preserving the ergonomic abilities of FFTT finger tapping process.

Coding majuscule letters: For FFTT sensing devices that can differentiate between hand resting on surface and hand in lifted position; the lifted palm position allows coding very simply the majuscule letters by using the same finger-taps combinations as those used for the corresponding minuscule letters but with the hands in lifted-palm position. Reference is made to Table 1 showing codes of the finger-taps combinations attributed to majuscule letters, obtained simply by replacing the minuscule notation 'l' and 'r' with the majuscule notation 'L' and 'R'. Some members or some configuration of members of FFTT apparatus family do not detect the lifted-palm position, in such case the combination of the majuscule letter is simply the code of the miniscule letter preceded by the combination 'l3-l4/' for computer keyboard [Shift] key or 'l4-l5/' for [CapsLock] key.

A mnemonic method that makes it easier for the typist to remember the codes associated to the letters and to learn quickly how to tap-to-type is described here. To remember easily the coding rules, the letters are grouped 5 by 5 and the fingers '1, 2, 3, 4 and 5' of the right hand together with the first finger of the left hand are associated successively to the group of five first letters; then the same series of right hand fingers with the next left hand finger to the next group of 5 letters etc. . . . . Reference is made to Tables 2 showing the grouping of the miniscule letters 5 by 5. All what is needed is to remember the letters 'a, f, k, p, u' with 'a' as starting letter for group 1; 'f' for group 2; 'k' for group 3; 'p' for group 4 and 'u' for group 5 the rest comes intuitively. To the 26th letter 'z' is attributed the combination noted 'r1-r5'.

Coding number digits: Number digits are also produced in a simple and mnemonic way; the left hand finger 1 is simply attributed to digit '1' and finger 2 to digit '2' etc. . . . until '5'. To the digits '6, 7, 8, 9 and 0' are attributed the right hand fingers 5, 4, 3, 2 and 1. Reference is made to Table 3 that shows the finger-taps attributed to number digits.

Coding other printable characters: Having used most of same hand single-finger-taps combinations, two-finger-taps of same hand are used to code other frequently used ASCII characters. Reference is made to Table 4 that shows the coding of frequently used printable characters with combinations of concurrent same hand two-finger-taps. Table 6 shows the coding of other printable characters with combinations of concurrent three-finger-taps (1-finger-tap of left hand and 2-finger-taps or right hand).

Coding other computer keyboard keys: To most frequently used computer keyboard keys are associated the simplest finger-taps combinations, the most intuitive and the easiest to remember. Therefore other easily executable two-finger-taps are associated to frequently used keyboard control keys like for example the two fingers code 'l3-l4/' to [Shift] key or the two fingers code '/r3-r4' to [BackSpace] key etc. . . . . Reference is made to Table 5 showing the coding of some frequently used keyboard control keys with combinations of concurrent two-finger-taps. Table 7 shows the coding of other keyboard control keys with combinations of concurrent three-finger-taps. Same hand concurrent 3 and 4 finger-taps that are easily executable are used to code other remarkable keyboard-keys.

Repetition of a characters or a keyboard-key: If the fingers producing the finger-taps of a combination remain in contact with the surface, then as long as they remain on the surface FFTT repeats the corresponding character or keyboard-key each time a predetermined repetition time interval elapses, the repetition stops when the fingers leave the surface.

Coding other characters: As different languages have their different characters, FFTT character coding can of course be adapted to any language by attributing finger-taps combinations to the characters in function of their alphabetical order or their frequency of use.

Making use of double finger-taps: In FFTT advantage can be made of double-taps of same single finger or same group of fingers for coding some remarkable commands. In any case FFTT treats double tapping of one or more fingers as two successive identical combinations of finger-taps.

Tap-to-type with a single hand: In FFTT it is possible to use one hand only and still be able to tap-to-type all characters and computer keys. One hand can execute the finger-tap combinations of the two hands; instead of executing the taps simultaneously with the two hands, they are executed successively with the same hand. The same hand executes the 2 sub-combinations of the two hands. The sub-combination of the left hand is executed followed by the sub-combination of the right.

Customizing finger-tap combinations: In FFTT it is also possible to map the finger-taps differently from the standard configuration in order to avoid those combinations that some users have difficulties to produce and replace them with those they can produce with less difficulty. FFTT software will guide the user with an intuitive wizard interface to complete the remapping.

Associating finger-tap combinations to FFTT Commands related to pointing/selecting device: In FFTT it is possible to associate finger-tap combinations to the movements and to buttons actuation of pointing/selecting devices such as computer mouse, joysticks and other gaming or machine controller. FFTT software allows the user to select the type of pointing/selecting device and to associate finger-taps to its functions. FFTT can achieve this in different ways like for example tapping with 1 or more fingers to move the cursor left, right, up or down or to select objects on the display. For example FFTT can associate pointer/selector (display cursor) movements to 2-fingers-taps of the same hand; e.g. one 2-fingers-tap r4-r5 moves the pointer/selector one step to the right, r3-r5 moves it one step to the left, r2-r5 one step up and r1-r5 one step down. FFTT determines the speed of movement of the fingers before the tap and uses it to modulate the length of the step of cursor movement. The faster the fingers before the taps to longer the step. Also FFTT can map mouse button clicks in for example the following manner:

- a 2-fingers-tap r3-r4 on the surface is equivalent to a computer mouse left click and
- a 2-fingers-tap r2-r3 on the surface is equivalent to a computer mouse right click.

Associating finger-taps to FTLT phonemes and morphemes: Finger taps Language technology (FTLT) is based on the idea of associating finger-tap combinations to language atomic elements (phonemes or morphemes like words or syllables). For example the word 'I' is attributed simply one tap of finger '1' of the left hand (coded l1) and to the word 'you' is attributed simply one tap of finger '2' of the left hand (coded l2). A combination of finger-taps coded code1 is attributed to the verb 'to like'. By executing the succession of finger-taps combinations l1_code1_l2 the user produces the sentence 'I like you'. In another example to the word 'he' is attributed one tap of finger '3' of the left hand (coded l3) and a double tap of finger '3' of the left hand is interpreted as word 'they' the plural of word 'he', also a combination coded code2 is attributed to the verb 'to go' and a combination coded code3 to the word 'cinema'. So by executing the train of finger-taps combinations l3_l3_code2_code3 the user produces the sentence 'They go cinema' and a software spelling and grammatical correction changes the sentence to 'They go to the cinema'. These are simple and correct sentences generated by a few finger-taps that can be validated by the operator and instantly converted by FTLT device to a voice sentence. This illustrates how FTLT can allow speech deficient people to produce vocal sentences in a easy and fast manner. Basically speech deficient people will be able to talk simply by tapping with their fingers on a surface. If the executed train of finger-tap combinations generate a sentence that does not make sense or is not grammatically correct, FTLT software will propose a list of possibilities of correct sentences based on the words associated to the produced finger-taps combinations. From the proposed list, the operator selects the sentence with the meaning he wants. If the sentence with the required meaning is not in the list, the user selects the one with the closest meaning and refines it further as necessary. FTLT software learns the language style of the user including frequently used words and sentences. The learned user style is used by FTLT software to propose customised lists of possible phrases when only few combinations of finger-taps are produced or when the sense of the generated sentence is not clear enough.

Main Steps of FFTT Implementation

To implement FFTT it is necessary to perform the following steps:
1. Detect the taps while the fingers are tapping on a surface.
2. Identify which finger produced each detected tap.
3. Sort the detected finger-taps in succession of groups of concurrent taps.
4. Convert the groups of concurrent finger-taps into FFTT Commands; and
5. Execute the generated FFTT Commands.

Whichever is the appropriate technology used to support FFTT, it needs to be able to perform one or more of these main tasks. Task 1 and 2 are assured by FFTT data processing software in conjunction with an instrumentation based on appropriate technology called FFTT finger-tap sensing device. The role of such device is to sense and transfer information that allows FFTT to detect finger-taps and identify the fingers that produced them. As it is described later, FFTT finger-taps sensing device can be based on Computer Vision technology, haptic touch sensing technology, contact acoustic sensing technology, or any other sensing technology capable to detect concurrent multiple finger-taps in a fast, reliable and robust manner, when the user is tapping on a surface with the fingers free from any instrumentation. To assist FFTT in achieving tasks 1 and 2 FFTT sensing device need to be, for the least, able to acquire data related to the location of occurrence and the time of occurrence of the each finger-tap. Tasks 3, 4 and 5 are performed by FFTT processing software. Knowing the time of occurrence of each detected finger-tap, FFTT software sorts the finger-taps in succession of groups of concurrent taps. To sort (or parse) the finger-taps FFTT software needs to determine at a given time which finger-taps occur simultaneously and differentiate them from those occurring simultaneously a little later. This is achieved by:

considering that all finger-taps detected during a short time window T are time-correlated and belong to same group of concurrent finger-taps bearing in mind that the chronological order of occurrence of the finger-taps during the time interval T is not important (i.e. no sequential order or reproducible order is necessary) and by considering that two successive groups of time-correlated finger-taps are separated by a time interval U.

Detecting Combinations of Concurrent Finger-Taps

What is a finger-tap? For FFTT a finger-tap on a surface is the event of a finger moving towards the surface touching it briefly and then leaving it. Mostly the taps are very brief and the time spent by the finger in contact with the surface it very brief, but it happens in few cases that the user keeps the finger on the surface to produce a predetermined effect. Note that when in contact with the surface, the finger producing the tap does not need to move or slide on the surface. A finger-tap consists of the movement and interaction of a finger with a surface that comprises the following successive phases:

finger moving toward the surface and entering in contact with the surface.

finger in contact with the surface staying immobile in contact with the surface for certain time duration called time of contact; and finger in contact with the surface, leaving the surface and moving away from the surface.

FFTT makes use of several parameters characterising the finger-tap; these parameters are recorded by FFTT, they include:

the identity f of the finger that produces the finger-tap;

the time t when the finger enters in contact with the surface;

the time t' when the finger leaves the surface; FFTT deduces the time of contact t'-t of the finger-tap;

the speed and acceleration of the finger entering in contact or leaving the surface can be measured and exploited by FFTT;

the pressure applied by the finger on the surface during the tap can also be measured and exploited by FFTT.

In terms of notation Pij is the finger-tap number j of combination Ci of concurrent finger-taps where j=1 to n, n is the total number of finger-taps detected in combination Ci. Pij=P(fij, tij) where fij is the finger that produced at time tij finger-tap Pij in combination Ci.

What is a combination of concurrent finger-taps? For FFTT it is a group of finger-taps all happening at the same time. When FFTT detects the first finger-tap in the combination it performs the following tasks:

it registers the time t1 at which the first finger-tap occurred, it opens a short time window T and considers all finger-taps that happen between t1 and t1+T as being time correlated. In fact FFTT uses a time window T that is small enough to consider these finger-taps as concurrent and register them as happening at the same time.

it registers as combination of finger-taps each group of taps it considers as happening at the same time.

In FFTT the time window T is a known parameter and a combination of concurrent finger-taps is characterised by several parameters; these parameters include:

All characteristic parameters of the finger-taps belonging to the combination are inherited by the combination.

the time t1 when occurs the first finger-tap of the combination; it is equal to the time t when the finger f1 producing the first finger-tap enters in contact with the surface.

the time t' when the last finger in the combination leaves the surface. The time interval t'-t1 is then the time of contact or time during which the combination of fingers stayed in contact with the surface.

In terms of notation $Ci=\{Pi1, Pi2, \ldots, Pin\}$ is the combination number i of finger-taps Pij, where j=1 to n, where n is the total number of finger-taps Pij detected in combination Ci.

What is a succession of combinations of finger-taps? For FFTT it consists of a series of combinations produced sequentially one after the other separated by a time pause U allowing FFTT to make distinction between two consecutive combinations. This distinction is part of the process of sorting (or parsing) of detected finger-taps. In terms of notation $R=\{C1, C2, \ldots, Cm\}$ is the detected series of combinations of finger-taps Ci where i=1 to m, m being the total number of combinations in the series of combinations R.

FFTT Characteristic Time Intervals

FFTT user produces trains of combinations of time-correlated finger-taps. The time factor is very important for FFTT system and for the way it is operated. There are several time intervals intervening in FFTT methodology these time intervals are called FFTT characteristic time intervals.

FFTT finger-taps combination time window T: Finger-taps are events that are produced by human beings and human beings are not machines, so it is obvious that they cannot produce groups of concurrent finger-taps that are all occurring perfectly at the same very instant. When a combination of finger-taps is produced the fingers do not all touch the surface at the same time. Therefore in order to detect combinations of finger-tap, FFTT considers that all finger-taps events occurring within a same time window T as being time correlated and therefore belonging to the same combination of finger-taps. Time window T is called finger-taps combination time interval. The chronological order of occurrence of the finger-taps within time interval T is not important; the finger-taps have just to all occur during the same time window T to be considered as part of the same combination of finger-taps, the time window T is set small enough to consider all these finger-taps events as happening at the same instant. The time window T is adjusted either automatically by FFTT system or manually by the operator.

FFTT time pause U between two consecutive combinations of finger-taps: Groups of concurrent finger-taps are produced sequentially one after the other and are distinguished (sorted, parsed) by a time pause U corresponding in general to the shortest time it takes the fingers, after they leave the surface, to travel up then down before they touch the surface again. Trains of consecutive combinations of finger-taps are produced by the user; after executing one group of finger-taps and by moving the fingers up and down the user allows a time pause U before executing the next combination of finger-taps; thus allowing FFTT to separate consecutive combinations of finger-taps. U is called FFTT distinction time pause of finger-taps combinations. The time pause U is the other time interval that is very important in FFTT. Obviously it is not constant; it depends mostly on the user; the faster the user can produce finger taps the smaller are the time intervals T and U, typically normal users can produce 2 to 6 finger taps per second; therefore normally T+U typically lays between ⅙ and ½ sec. FFTT functions in real time therefore the fact that it is based on CV techniques, on touch sensing techniques, acoustic sensing techniques or other finger-taps sensing techniques have no effect or only a small effect on time intervals T and U.

Sorting detected finger-taps: FFTT software uses time intervals T and U to sort detected finger-taps in succession of groups of concurrent finger-taps. This process is achieved by:

Grouping all finger-taps detected during a same time window T in a same group of concurrent finger-taps; and Distinguishing two successive groups of concurrent finger-taps by a time interval U.

FFTT finger-taps combinations repetition time interval V: In fact when the first finger-tap of a combination is detected at time t1, FFTT opens two pre-set time counters one for T and one for V. Time interval V is used when the fingers-tips remain on the surface after the time interval T elapses. If at least one finger fj of the combination stays in contact with the surface longer or equal to time interval V; i.e. t'j−t1>=V, then FFTT Command associated to the combination is executed and this way the command could be executed k times if t'j−t1>=k·V unless all fingertips of the combination leave the surface. In other words if the fingertips remain in contact with the surface, FFTT repeats the execution of the FFTT Command associated to the finger-taps combination each time interval V elapses. Note that necessarily V>T. The notion of repetition time V is not always exploited by FFTT; for example the repetition time can be useful for text typing but not necessarily needed for FTLT.

Other FFTT time intervals and variations of finger-tap combinations: Other time intervals can be exploited by FFTT to extend the possibilities to make use of the finger-taps events. For example when a combination consisting of more than one finger-tap is executed, one or more fingertips remain on the surface while one or more fingertips leave the surface at once or one after the other at different times, which results in producing additional variations to the original finger-tap combinations; with the objective of producing additional FFTT Commands.

Case where FFTT is implemented with one hand only: A combination that is normally executed by two hands can if needed be executed by one hand only in two parts (two sub-combinations) and FFTT consolidates the two sub-combinations in one combination. The time pause W between two sub-combinations of same combination of finger-taps is also used by FFTT to distinguish between two sub-combinations.

Training the user to optimize FFTT time intervals: It is absolutely primordial that the time intervals are respected in order for FFTT methodology to first function properly; if these time interval are too irregular FFTT might fail to reach its objectives by producing too many unwanted wrong FFTT Commands and second achieve fast typing or talking; it is essential that very brief bursts of simultaneous finger-taps are produced separated by a brief pause; and this in a regular manner. Therefore the user learns to respect and to optimize time intervals T, U and W. Concerning time window T the user learns to produce the desired combination of fingers-taps in bursts as prompt as possible within a minimized time window T. Concerning time intervals U and W the user learns to separate two consecutive combinations with a pause U, and the two one-hand sub-combinations with a pause W, in a regular manner. The more experienced the user becomes, the shorter T, U and W become.

Adjustment of FFTT time intervals: FFTT characteristic time intervals are adjusted either manually by the operator using FFTT software or automatically by FFTT system in an adaptive manner by continuously analysing the tapping pattern and pace of the operator. For time durations T, U and W, as mentioned before, the faster the user can produce the finger-tap combinations the smaller are T, U and W, therefore FFTT adapts automatically to the user tapping speed and style by adjusting these time intervals. Time interval V is set by the software or adjusted manually by the user.

Figure 22A:
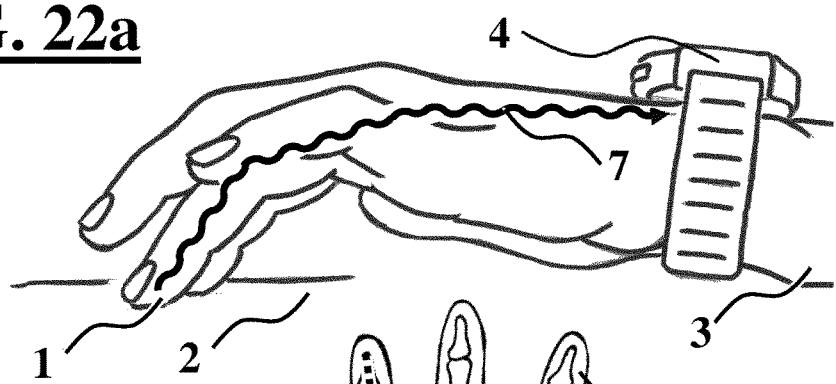
FIG. 22a, FIG. 22b and FIG. 22c show a side view and a top view of an example of watch-microphone FFTT apparatus and an illustration of the sound waves propagation through the finger bones.
Figure 22B:
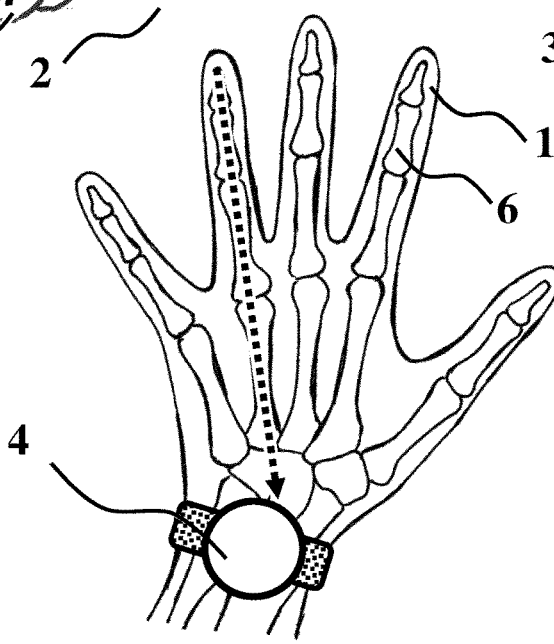
Figure 22C:
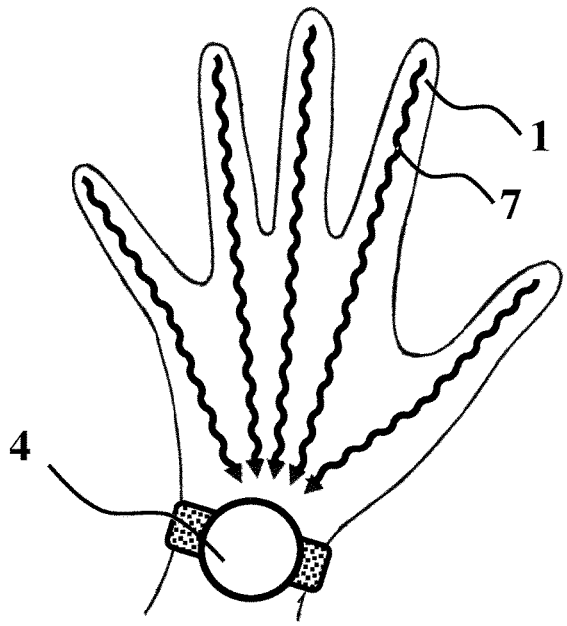

FFTT Makes Use of Existing Techniques to Detect Combinations of Concurrent Finger-Taps There is a large variety of appropriate instruments called FFTT finger-tap sensing devices able to assist FFTT in detecting combinations of concurrent finger-taps; they are based on a number of existing technologies including CV techniques, haptic touch sensing techniques, acoustic sensing techniques, and other technologies. Each of these technologies offers a family of FFTT sensing devices able to help FFTT detect finger-taps and identify the fingers that produced them. Reference is made to FIG. 1a, FIG. 1b, FIG. 2a, FIG. 2b, FIG. 3a, FIG. 3b, FIG. 4, FIG. 5, FIG. 6, FIG. 7a, FIG. 7b, FIG. 8, FIG. 22a, FIG. 22b, and FIG. 22c representing different and non-limiting examples of FFTT apparatuses where the user 3 taps with his fingers on a surface 2 and produces combinations of time-correlated taps associated to codes that are converted to FFTT Commands. In FIG. 1a, FIG. 1b, FIG. 2a, FIG. 2b, FIG. 3a, FIG. 3b, FIG. 4 and FIG. 5 the represented examples of FFTT apparatuses comprise optical sensing devices 5 and use CV techniques to detect finger-taps. In FIG. 6, FIG. 7a, FIG. 7b, and FIG. 8 the represented examples of FFTT apparatuses comprise touch sensing surface 2 and appropriate electronics devices used to help FFTT in detecting finger-taps. In FIG. 22a, FIG. 22b, and FIG. 22c the represented example of FFTT apparatus comprise a device 4 based on contact microphone techniques used to help FFTT in detecting finger-taps. These FFTT apparatuses process sensed information and data to produce and display locally responses to FFTT Commands or remotely by sending the acquired data (with wired or wireless connection) to an Information Processing Device that is running FFTT software capable to process the data to produce and display the responses to FFTT Commands.

Figure 15:
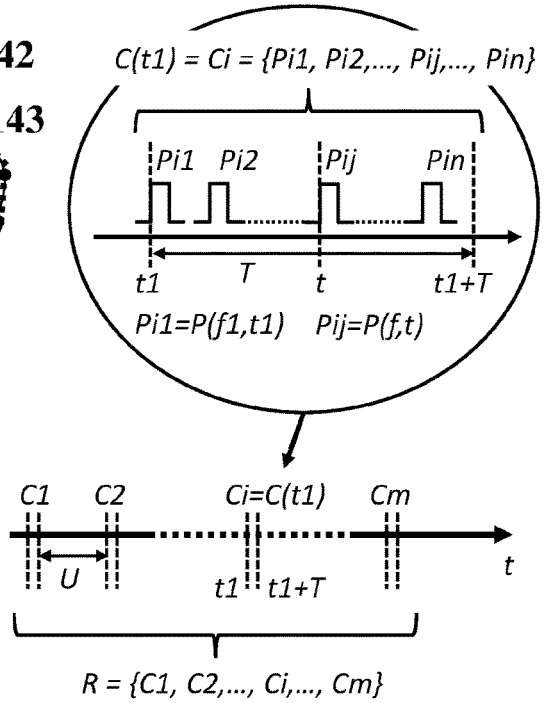
FIG. 15 shows an illustration of a schematic representation and a notation of a succession of groups of time-correlated finger-taps.

What is an FFTT sensing device? It is a device that allows FFTT to detect finger-taps and identify the fingers that produced them. Using an FFTT sensing device FFTT detects trains R=(C1, C2, . . . , Cm) of finger-taps combinations Ci where i=1 to m, in being the total number of combinations in the train of combinations R. Ci={Pi1, Pi2, . . . , Pin} Ci is the combination number i of finger-taps Pij, where j=1 to n, n being the total number of finger-taps detected in combination Ci. Pij=P(fij, tij) where if is the identified finger that produced at time tij finger-tap Pij number j in combination Reference is made to FIG. 15 as an illustration for these notations representing a succession of groups of time-correlated finger-taps. FIG. 15 shows also a schematic representation of a succession R of combinations Ci of concurrent finger-taps Pij. Using an FFTT sensing device, the steps followed by FFTT to recognize series of finger-taps combinations are:

Detecting finger-taps P(f, t) and recording their time of occurrence t.

For each detected finger-tap P(f, t) the finger f producing the tap is identified.

When a first tap of a combination is detected at time t1, FFTT opens a time window T and considers all finger-taps P(f, t) such as <t1+T as belonging to the same combination Ci=C(t1) of finger-taps; C(t1)={P(f1, t1), . . . , P(f2, t2), . . . , P(fn, tn)} where ti<t1+T for i=1 to n, n being the total number of taps detected in combination C(t1).

Minimum specifications and requirement for an FFTT sensing device: Whichever is its underlying technology an FFTT sensing device must be able to help FFTT in:

Detecting simultaneous finger-taps produced by multiple fingers.

Identifying which finger produced each finger-tap.

Resolving spatially all tapping fingers, i.e. differentiating between the tapping locations of all fingers.

Resolving temporally two successive fingers-taps knowing that FFTT users can produce several finger-taps per second.

Detecting even the slightest finger-tap or touch.

Use of Computer Vision Techniques for FFTT Implementation

Figure 10A:
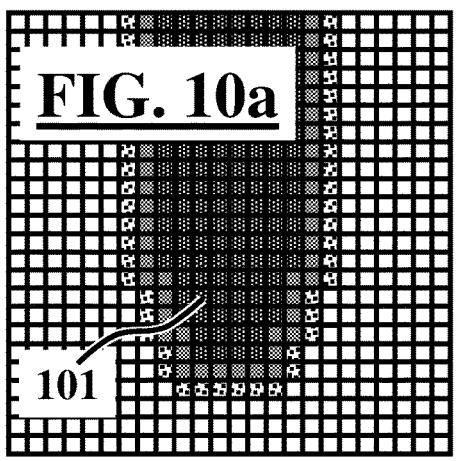
FIG. 10a shows pixels representation of finger image and FIG. 10b shows an image representation of finger edge pixels.
Figure 10B:
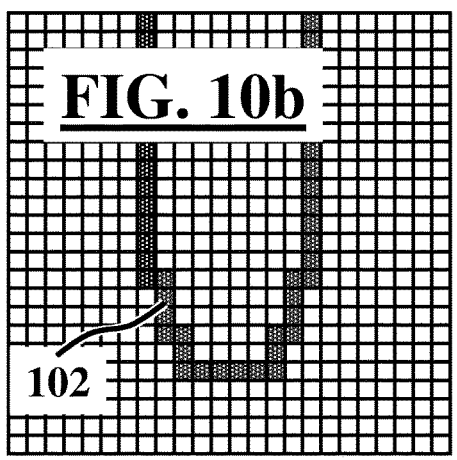

Computer Vision (CV), also called image understanding, corresponds to the automatic deduction of the structure and the properties of a possibly dynamic three-dimensional world from either single or multiple 2D or 3D images. The images may be monochromatic or in colour, they may be captured by a single or by multiple optical sensor(s) or camera(s), and each optical sensor may be either stationary or mobile. CV techniques make use of optical devices and computer programming to automatically receive and interpret images of a real scene in order to obtain information and/or control machines or processes. CV techniques include various approaches to modelling the world seen by the optical sensor or camera such as object detection, object recognition, or object tracking. To acquire object images CV uses optical sensors such as Charge-Coupled Device (CCD) or Complementary Metal-Oxide Semiconductors (CMOS), photo-sensors or other light sensors. FFTT makes use of optical sensors to acquire fingers images and/or tapping surface. Reference is made to FIG. 10a and FIG. 10b that show optical sensor images representing a group of pixels corresponding to a finger 101 and a group of pixels corresponding to the finger edge 102. CV offers a large variety of techniques that when used alone or combined can detect multiple finger-taps in fast, reliable and robust manner as required by FFTT. Therefore CV techniques are among the techniques that allow successful and effective implementation of FFTT; in this regard CV techniques are also among the most ubiquitous implementation techniques of FFTT.

How are CV techniques used in the implementation of FFTT? For an FFTT sensing device based on CV techniques to be capable to help FFTT in detecting effectively finger-taps it needs to be able to assist FFTT in performing its main tasks (ref. par. [71]). FFTT sensing device based on optical emitters and/or sensors can help FFTT achieve task 1 and 2. It acquires optical data of the fingers tapping on the surface and transfers them to FFTT data processing software. FFTT uses CV algorithms and techniques to analyse these optical data in order to detect the finger-taps and identify the fingers that produce them. Tasks 3, 4 and 5 are performed by FFTT processing software independently form the optical sensing device.

Fingers detection by CV techniques: A multitude of CV methods are suitable for detecting fingers in still images or sequential images; methods relying on finger shape, appearance, texture, motion, temporal information as well as methods based on other approaches such as classifiers independent of the finger shape or posture like for example Haar-like classifiers.

Finger edge detection: In image processing an edge corresponds to the line or lines of pixels constituting the boundary between an object and the background. Edges form the outline of an object. Referring to FIG. 10b showing the group of edge-pixels delimiting the finger from the background 102; such group of edge pixels is identified by appropriate CV edge detection techniques. Edge detection is an essential process in CV as it involves in the identification, classification and tracking of objects in an image. Using CV in FFTT, if the finger edges in an image can be identified accurately, the fingers can be located and tracked. There are specific techniques that constitute the basis of large variety of algorithm families that are used to detect and enhance edges in CV, among them are: object edge finding by approximating the gradient or the Laplacian of pixel values in an image; object Contours finding; snakes=Active contour models; B-splines and so forth.

Finger extraction by image segmentation: Image segmentation is an essential process in CV as it involves the process of partitioning a digital image into distinct non-overlapping regions called blobs corresponding to homogeneous groups of adjacent pixels delimited by edge pixels with respect to a chosen characteristic property (such as colour, grayscale intensity, depth threshold, texture, motion etc. . . . ). For FFTT appropriate image segmentation techniques allow extracting finger blobs that group together pixels baring finger characteristics, in other words these techniques allow FFTT to delimit the fingers and determine their boundaries (edges, contours, silhouettes, etc. . . . ).

Finger extraction by image thresholding: thresholding is the simplest method of image segmentation; from a grayscale image, thresholding techniques can be used to create binary images. During the thresholding process, individual pixels in an image are marked as 'object' pixels if their value is higher (or lower) than some threshold value—assuming the object to be brighter (or darker) than the background—and marked as 'background' pixels those with a value lower (or higher) than the threshold. This process corresponds to a simple background subtraction. Typically, a pixel of an object (hand finger) is given a value of 1 while a background pixel is given a value of 0. Background subtraction is a commonly used class of techniques for segmenting objects; for FFTT it involves subtracting the observed image from the estimated image and thresholding the result to extract the finger blobs.

Fingertips detection: Once the contour of the hand and fingers is computed, in order to find the fingertips different approaches can be used including:

Fingertips are assimilated to the pixels that represent peaks along the fingers contour (edge) and are detected by simple trigonometric calculation based on the fact that the peak is the summit of an angle smaller than a given threshold value.

In 3D the overall shape of a human finger is approximated by a cylinder with a hemispherical cap. Thus, the projected shape of a finger in an input 2D image appears to be a rectangle with a semi-circle at its tip.

In 2D the quasi-semi-circular shape of the fingertip is detected based on local circular features of the finger contour, determined from the edge image using Hough Transform.

Thermal infrared (IR) imaging sensors: While for implementing FFTT most of the presented techniques related to solving the problem of detecting and tracking fingers in image sequences are based on ambient light sensors, there are techniques using thermal IR sensors in particular operating in mid-wave (MWIR) and in long wave (LWIR) ranges. Depending on the conditions, ambient light reflected by the object of interest can vary in intensity, direction and frequency and thus affect the result of hand and fingers regions extraction based on image segmentation or background subtraction methods. One way to reduce this dependency is the use of infrared camera sensor adjusted to measure a temperature range approximating human body temperature (30 to 34 degrees C.) knowing that thermal radiation or infrared light is emitted by objects according to blackbody radiator or Plank law. This effect raises the probability of pixels that are corresponding to human skin above the probability of pixels that are not, since the human skin is normally warmer than the background. Therefore, even with complex backgrounds and changing light, this approach allows to easily extract image regions corresponding to hands and fingers.

Fingers tracking by CV techniques: If the finger detection method is fast enough to function at the frame rate of the image acquisition then it can be also used for finger tracking. In other words if the same finger is detected in each image frame then its location is known and updated in each image frame which results in tracking the finger in the image sequence. Fingers tracking can also be achieved by tracking the location and the deformation of the whole hand including the fingers. The two main distinct categories of methods for hand tracking are (i) appearance-based methods and (ii) model-based methods. Appearance-based methods generally establish a mapping between the image feature space and the hand and fingers configuration or appearance space. Model-based methods are generally deformable hand shape models fitted with statistical or kinematic models.

Finger tracking based on skin colour: In CV colour based algorithms constitute some of the fastest and easiest methods for tracking objects from one image frame to the next. Skin colour provides an efficient visual cue for finger tracking allowing real-time performance to be obtained. Skin coloured pixels have predictable statistics, they are modelled using histogram distributions estimated from training images with patches of skin pixels obtained from images with hand skin and histograms of non-skin pixels from images without hand skin.

Finger tracking based on Motion Field and Optical Flow techniques: In CV the Motion Field is an ideal construction, based on the idea that it is possible to determine the motion of each image point. It is a representation of 3D motion by projection onto a 2D camera image. It is illustrated by the direction and distance with which every point moved in image coordinates from one frame to the next. The Optical Flow is an approximation of the Motion Field because the Motion Field cannot be correctly measured for all image points. There are several different ways to compute the Optical Flow based on different criteria of how an optical estimation should be made. Optical Flow and Motion Field allow an easy segmentation of moving objects in the image sequence; it is achieved by applying image segmentation methods to the motion blobs corresponding to regions of uniform flow (in direction and speed). While traditional segmentation indicates the static similarities (colour, texture etc.) in an image, Optical Flow allows groupings on the basis of dynamic similarities; it identifies what areas are moving together. Optical flow is used for the detection and tracking of finger blobs in FFTT with the following steps:

the Motion Field for the entire image is computed identifying regions of uniform flow in direction and speed; regions corresponding to moving fingers blobs.

Segmentation and extraction of moving fingers blobs.

Attracting other CV methods to areas of interest to Motion Field areas; motion blobs direct these CV processing stages to attention areas: regions corresponding to moving fingers.

In addition Optical Flow can be used to track selected image features, usually strong edges (like finger edges) or other areas with high image gradients.

Temporal tracking and filtering: Dynamic filters improve the CV system performance significantly, as they help estimate the position and characteristics of an object given its position and characteristics in the previous frame. Kalman filtering takes advantage of smooth movements of the object of interest. At every frame the filter predicts the location of the object (finger) based on its previous motion history assuming that the state variables (features) are normally distributed (Gaussian). Tracking objects in video images involves the modelling of non-linear and non-Gaussian systems, this fact justifies the use of Particle filtering (estimation of Bayesian model) based on particle representation (simulation) of the feature space distribution (as colour, or texture distribution). The condensation algorithm (Conditional Density Propagation) is a CV algorithm which principal application is to detect and track the contour of objects moving in a cluttered environment. Condensation is a probabilistic algorithm that identifies which pixels in an image form the contour of an object such as fingers. The result is highly robust tracking of agile motion in clutter as it can be the case for fast tapping fingers.

Figure 14:
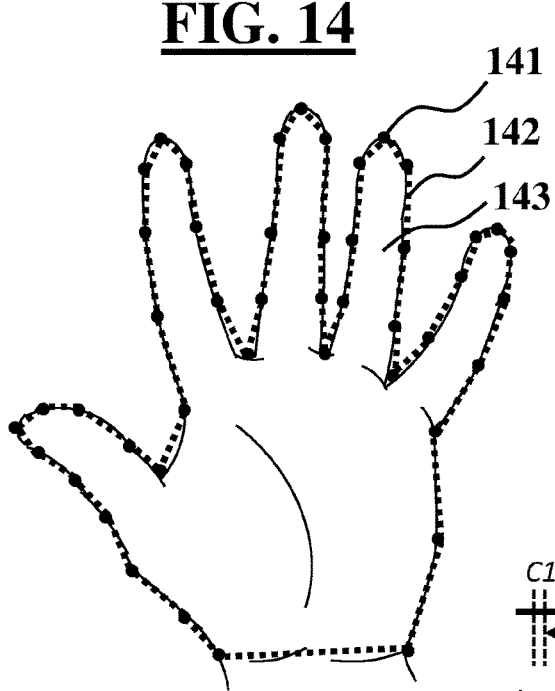
FIG. 14 shows an illustration of an Active Shape Model of the hand and fingers represented by a set of landmarks.

Using Active Shape Models for hand fingers identification and tracking: Active Shape Models (ASMs) are mathematical models representing shapes of the objects of interest like hand fingers in images. As shown in FIG. 14 the shape 142 of the hand and fingers 143 is represented by a set of points (landmarks) 141 controlled by the ASM which deform iteratively to fit to a labelled example (learned shape) of the hand and fingers. The ASM algorithm aims to match the model to a new image while the shape is constrained to vary only in ways learned in a training set of labelled examples. The algorithm works by alternating the following steps (i) Looking in the image around each landmark point for a better position for that point; (ii) Updating the model parameters to the best match of these newly found positions, obtained by minimizing a fitting or distance function. To reduce the computing cost, a shape can be modelled with a reduced number of independent parameters using the Principal Component Analysis (PCA) theory. A fast ASM algorithm able to fit the shape model to the hand and fingers present in every frame offers FFTT a robust tool to identify and track the hand fingers in the image sequence. The identification of the fingers is easily achieved because the positions of the fingertips are actually remarkable landmarks used by the ASM. This is also the reason why obtaining the location of the fingertips is straightforward from the landmarks positions and therefore the tracking of the fingers in every frame in a robust manner is a resulting trivial task.

Identifying and tracking fingers with Motion Capture techniques: In CV, Motion Capture (Mocap) is the process of sampling the posture and location information of a subject over time. The subject (actor) can be a person, an animal, a machine, a hand or a finger. The technical goal of motion capture is to get the 2D or 3D motion data of selected points of interest on the subject, so that either some parameters of the motion (e.g. position, speed, angle, distance) can be calculated or the data can be used to control or drive a virtual process, a machine or something else. For the purpose of FFTT implementation Motion Capture is applied for detecting the movements of the hand and fingers and translating them to a digital model. Fingers tracking and hand pose estimation can be performed in 2D, 2.5D, or 3D; where 2D refers to models of the hand and fingers that are defined directly in the camera image plane, while 2.5D approaches allow the model to have, in addition to 2D image data, relative depth information (i.e. 2D plus depth). Finally 3D approaches typically model the hand and fingers using geometrical 3-dimensional primitives such as the models illustrated in FIG. 17a and FIG. 17b. Vision-based hand Motion Capture and tracking systems can be classified into contour-based systems and model-based systems. The model-based Motion Capture use either markers-based or marker-less techniques to acquire 3D geometric information on the basis of accurate devices for real-time range (depth) image acquisition including stereo vision camera systems (multi-camera set up), depth cameras systems or laser scanning systems. For FFTT, Motion Capture is used to track hand and fingers as a whole in real time which allows at the same time to identify the fingers and keep track of their 2D or 3D positions.

Figure 16:
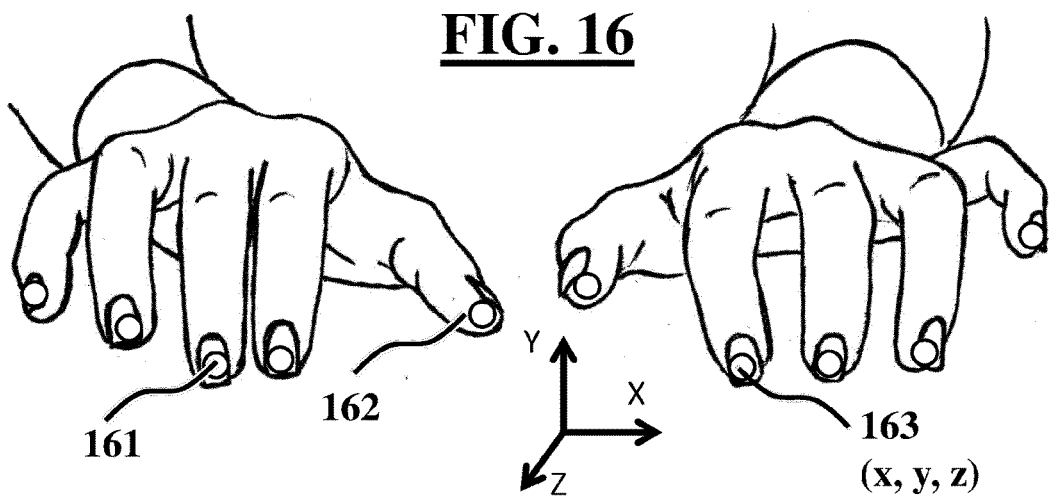
FIG. 16 shows fiducial markers placed on the fingertips, illustrating how their coordinates (x, y, z) are used to track very accurately the fingers positions.

Marker based Motion Capture: In CV the use of a Marker (visual fiducial) designates the process of marking a selected position on the surface of the object of interest by artefacts such as colours, patterns, light reflectors or other means. There are 'passive' or 'active' markers; passive markers do not generate light by themselves (e.g. reflective balls or checker-cross patches), while active markers do (e.g. LEDs). These markers are chosen in such way that they are detected by appropriate CV techniques in a fast, efficient and accurate manner. Markers positions are used to retrieve the 2D locations of the tracked objects (with monocular vision system or single camera system) or used to determine the 3D locations of the tracked objects (with stereo vision using optical systems consisting of calibrated cameras or with depth camera such as time-of-flight cameras). Reference is made to FIG. 16 showing the markers 161 placed on the fingertips 162, their coordinates 163 in 3D (x, y, z) are used to track very accurately the fingers positions. Active markers or reflective markers that emit or reflect natural or artificial light (from additional illumination such as IR, UV or other) are detected in images by intensity thresholding techniques and the location of their resulting blobs are tracked in 2D or 3D. The movements and arrangements of these markers are used to track in 2D or 3D complex and deformable objects such as hand fingers. Similarly colour markers are placed on the fingers and their locations are detected by colour segmentation techniques and the resulting blob positions are used to track fingers in 2D or 3D. Colour codes can be used to differentiate fingers or finger orientations. Active markers are powered to emit their own light such as a set of LEDs that are emitting continuously or one at a time. Additional refinement is obtained by time modulated active markers based on strobing effects or modulating the amplitude or pulse width to identify the markers. Appropriate software algorithms are used to locate and identify these markers by their relative positions, somewhat akin to celestial navigation.

Marker-less Motion Capture: Marker-less Motion Capture systems are most suitable Mocap techniques for FFTT implementation because they do not require apposing markers or wearing special equipment for tracking the hand fingers. Special software algorithms allow the marker-less Motion Capture system to analyse multiple streams of optical input and identify hand and finger forms and shapes and break them down into tracked constituent parts. Most marker-less motion tracking methods in CV fall into three categories. First, learning-based methods which rely on prior probabilities for hand and finger poses. Second, model-free methods which do not use any a priori knowledge, and recover articulated structures automatically. Third, model-based approaches which fit and track a known model using image information.

3D Model Based Techniques:

3D geometrical hand models: the hand constituents (palm, fingers, phalanxes, joints, etc.) are represented by an articulated model of simplified geometrical parts such as cylinders, ellipsoids, super-quadrics, truncated cones, or other geometrical objects. FIG. 17a and FIG. 17b illustrate two different 3D articulated hand models 171 and 174 where each finger 172 or phalanx 173 can move with one or more degrees of freedom (DOF). Each DOF correspond to a finger flexion (joint angle), a 3D coordinate or an orientation angle of the hand palm. The hand model is either (1) fitted to the hand image in 3D space by minimising a distance function computed over all voxels of the 3D primitives to the stereo vision image or to the depth camera image of the hand or (2) fitted to the 2D hand image achieved by projecting the 3D primitives on the image, and minimizing the distances to projected hand 2D silhouette, contour or edge pixels.

3D skeletal model: as illustrated in FIG. 18 precise hand fingers motions can be recovered using a 3D skeletal model 181 where the foreground hand and fingers 2D silhouette 182 sequences from multiple camera images, are used to compute, for each frame, the hand skeleton model pose 181 which best fit the hand and fingers pose. Among effective recovery approaches is for example fitting the skeletal structure of hand and fingers to a computed voxel-based Visual Hull (a 3D envelope shape approximation obtained from the 2D silhouette information 182 of every camera image).

Deformable surface mesh models: Other methods use models which are constructed from known example hand shapes obtained with independent means such as Magnetic Resonance Imaging (MRI) scanner or instrumented gloves. These methods rely essentially on a 3D version of Active Shape Models (ASM) where main shape variation possibilities are captured by only a few main components obtained by Principal Components Analysis (PCA).

Learning Natural Hand and Fingers Articulation: Model-based trackers commonly use a 3D geometric model, as for example those illustrated in FIG. 17a and FIG. 17b, with an underlying biomechanical deformation model. The hand palm and each finger phalanx can be modelled as a kinematic chain with one or more DOF. Hand motion is constrained as each joint can only move within natural limits; the motion of different joints is correlated, for example most people find it difficult to bend the little finger while keeping the ring finger fully extended at the same time. Data gloves (Cyber Glove) or MRI scanners are used to collect a large number of hand and fingers pose parameters in order to capture their natural movements and articulations. Collected data are used to train computer program to learn to monitor the motions of the palm and fingers and mimic human hands and fingers movements and postures.

Appearance based fingers identification and tracking: In CV fingers tracking can also be achieved by estimating arbitrary or pre-determined 3D human hand postures in real-time. The estimation can be based on 2D or 3D image retrieval. A posture database is first constituted for a large number of hand appearances (silhouette contours or edge pixels) generated from a given 3D shape model projection on 2D camera image by rotating and articulating the model in the space; the resulting postures are stored in an appearance database. Every appearance is tagged with its own constituents' parameters (fingers, joints, flexion angles, etc. . . . ). By retrieving the appearance in the database that is well-matching the input image contour, the constituents' parameters of the input shape can be rapidly obtained. For an adaptive and increasingly robust tracking, well-matching appearances are saved at every frame and used to strengthen subsequent searches in the appearance database. This approach allows detecting directly and identifying the fingers posture together with the hand in each frame. Tagged hand appearances correspond to the posture of the hand and fingers at the instant when the user is producing the finger-taps. In other words every possible finger-taps combination corresponds to a predefined tagged hand posture. So for FFTT a finger or a group of fingers is identified from the matching predefined hand and fingers appearance posture. The fingers locations are then tracked by finding the matching posture in each frame, which allows FFTT to keep tracks of the 2D or 3D location of each finger.

Use of Haar-like features classifiers finger detection and tracking: In CV, the techniques based on Haar-like features classifiers constitute the basis of very efficient and very fast object detection algorithms (detectors) used to recognize and track objects in image sequences. These algorithms function on the basis of detecting and encoding oriented contrasts between regions in the image. Each Haar-like feature is described by (1) a template which includes connected black and white rectangles, (2) their relative coordinates to the origin of the search window, and (3) the size of the feature (scale factor). Haar-like features include edge features, centre-surround features, special diagonal line features and line features. Boosting is a method to improve the accuracy of a given learning algorithm stage by stage in cascade manner to build strong classifiers from weak classifiers. Training algorithms build cascades of boosted classifiers with a set of 'positive' samples (finger images) and a set of 'negative' (no finger images).

The value of a Haar-like feature is the difference between the sums of the pixels' values within the black and white rectangular regions. After a classifier is trained, it can be applied to a region of interest in an input image of the same size as the one used during the training. The output of the classifier is 1 if the region is likely to show the finger and 0 otherwise. To detect a finger in the whole image a search window is moved across the image from the top-left corner to the bottom-right corner and every location is checked using the classifier. As Haar-like features detectors are very fast and function at the frame rate of the image acquisition they are very efficient for finger detection/tracking allowing FFTT to keep tracks of the fingers locations.

CV techniques using active light: the CV techniques described until now are based on passive light. Passive refers to the fact that the light already exists in the scene; the techniques use the light emitted from the object without additional light. It corresponds in most of the techniques to the light reflected by the object from its environment and for some techniques to the thermal light emitted by the object itself (finger skin). There are other CV techniques that make use of active light methods based on controlled illumination. For FFTT the fingers can be illuminated by an artificial light either visible or non-visible; as for example projecting a coded pattern light or structured illumination to accomplish more robust detection or tracking of the fingers by allowing CV techniques to acquire additional useful information from the sensors.

Figure 12A:
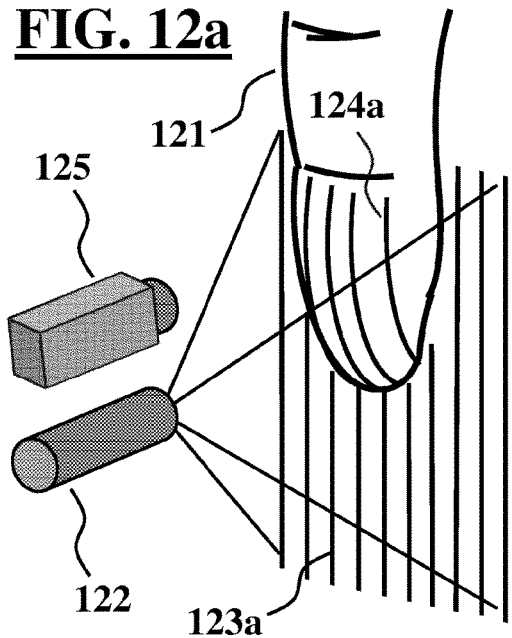
FIG. 12a and FIG. 12b show Structured Light Illuminations of a finger with a structure of parallel lines and with a structure of a matrix array of dots.
Figure 12B:
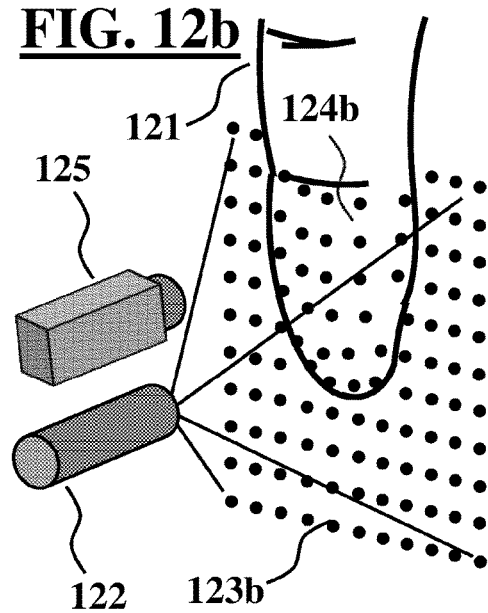
Figure 13A:
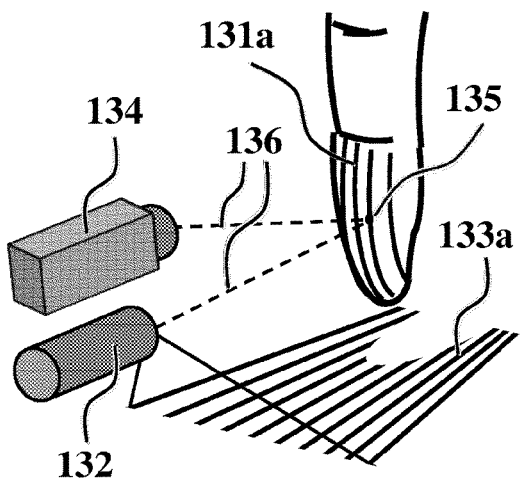
FIG. 13a and FIG. 13b show solid vertical lines and dot matrix SLI projected simultaneously on the finger and the on the surface.
Figure 13B:
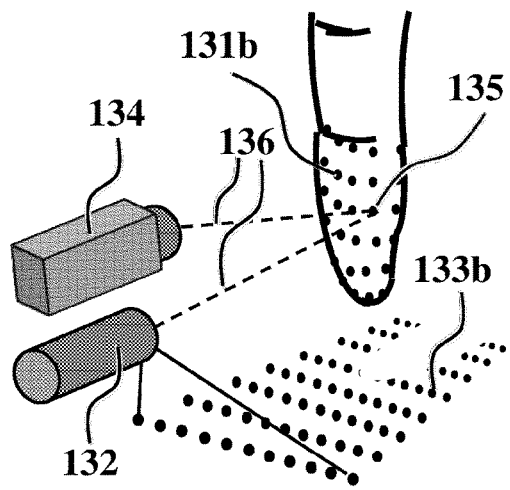
Figure 19:
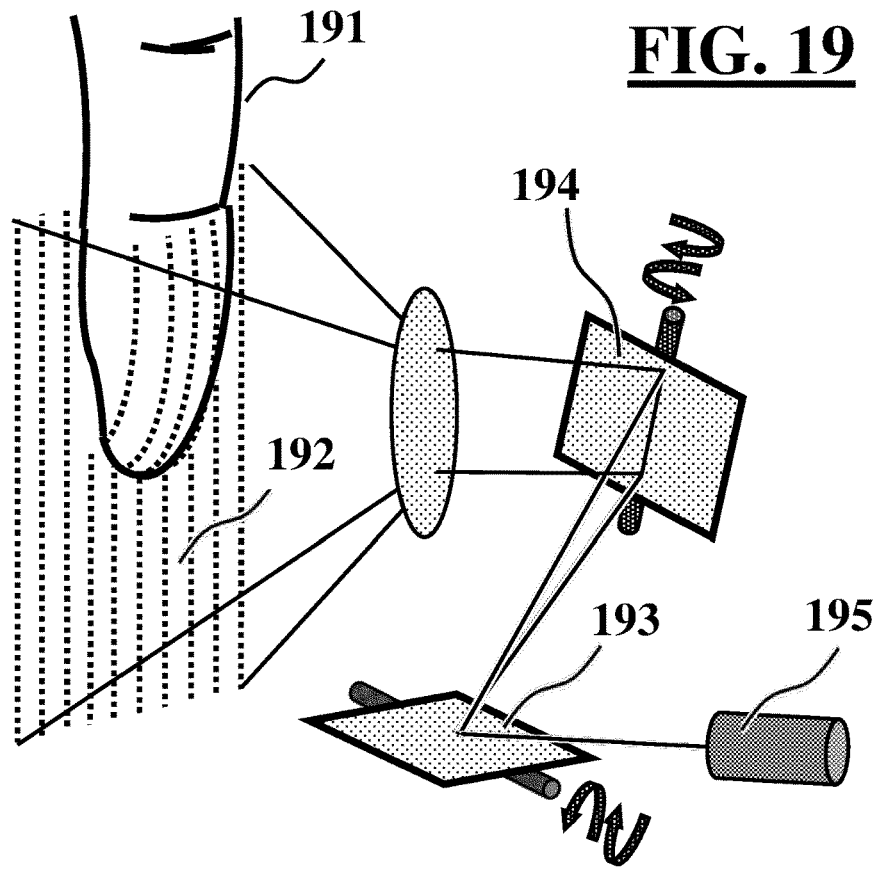
FIG. 19 is a sketch of an optical and mechanical system for a SLI scanning repetitively the fingers.

Structured light illumination: In CV Structured Light Illumination (SLI) techniques are used to obtain with only one single photo sensor (single camera) the depth information of the 3D surface of an object by measuring the effect of deformation of the pattern of a projected SLI when reflected by the object. To illustrate this deformation effect, FIG. 12a and FIG. 12b show a projector 122 projecting onto a finger 121 a light beam of solid lines (stripes) 123a (also called sheet of light) or a beam of light points (dots) 123b (also called matrix or cloud of light points or speckles). The projection of the light beam 123a or 123b on the 3D shape of the finger 121 results in curved deformations 124a or 124b. SLI may be produced by static projection devices (slide projectors, for example); also as illustrated in FIG. 19, SLI can be obtained by a projector 195 emitting a narrow beam (dot beam) of light and a system of rotating mirrors 193 and 194 deflects the projected beam in oscillating manner. Consequently the fingers 191 and the surface are repetitively scanned with a structured light beam 192. As shown in FIG. 12a and FIG. 12b for a given arrangement of the projector 122 and the photo sensor 125, the 3D deformation or variation of the pattern of the SLI can be measured extremely accurately from the photo data of the reflected light obtained by the photo sensor 125. This permits the reconstruction of the depth of the finger surface; the 3D location of each point of the SLI pattern reflected by the finger is determined by measuring the light path length for that point. As illustrated in FIG. 13a and FIG. 13b for each point 135 of the projected structured light, the light path length 136 is the distance traveled by the light from the projector 132 to the finger plus after reflection the distance from the finger, at the light point 135, to the photo sensor 134. SLI consists in general of visible, infrared or other light type in a form of Laser or other and making use of LEDs or other light emitters. Pulsed or frequency modulated SLI beams can be used for example to allow depth information measurement based on time-of-flight (TOF) techniques. These light beams are detected by cameras or other light sensors such as photo diodes (PIN diodes, avalanche photo diodes APDs, and so forth).

Depth cameras are devices that besides capturing images they determine the depth information of a 3D object or scene; they are based on different depth measurement techniques. They provide at frame-rate depth images consisting of traditional grayscale or colour data plus depth information for each pixel. Depth cameras providing colour plus depth information is sometimes designate as RGB-D cameras. Depth images are grayscale images where the objects of the scene are represented in layers ordered along the axis perpendicular to the camera image plane. Depth cameras are based on various techniques among the most used ones are time-of-flight (TOF) cameras, ranging cameras, flash LIDAR, coded aperture camera and so forth. Range gated imagers designate devices that have a built-in shutter in front of the image sensor that opens and closes at the same rate as the light pulses are sent out. Because part of every returning pulse is blocked by the shutter according to its time of arrival, the amount of light received relates to the distance the pulse has traveled from which the depth information is derived. Coded aperture of a camera is a mechanism that allows depth information to be partially or completely inferred alongside intensity through reverse convolution of an image that is captured with a specially designed coded aperture pattern.

3D Depth measurement makes use of well-known techniques; most used ones include the triangulation method and the time-of-flight (TOF) techniques.

Figure 20:
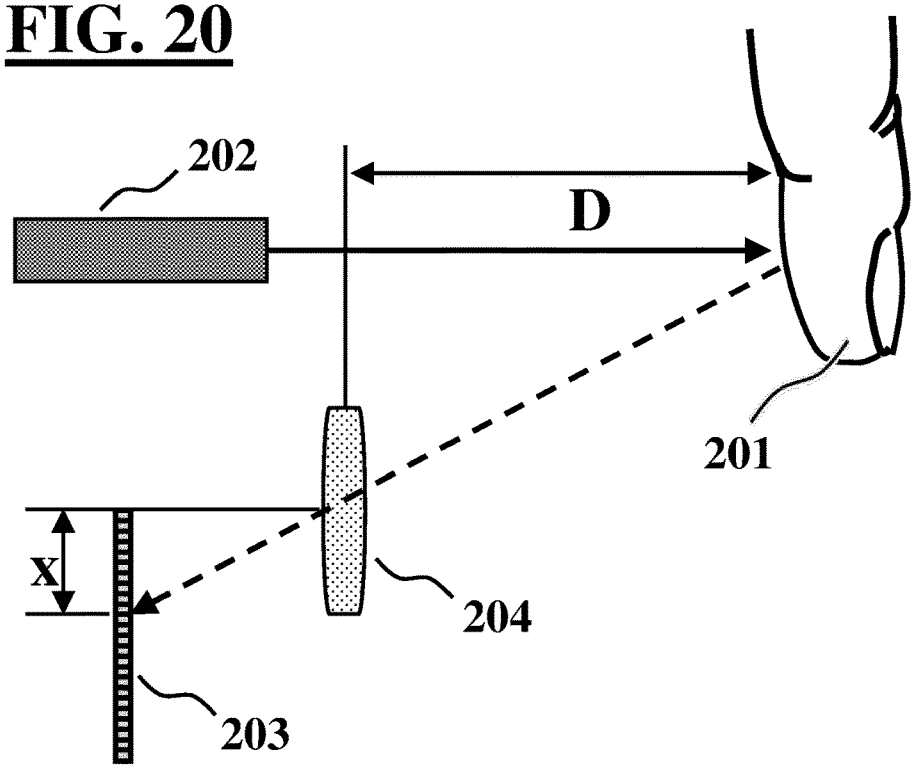
FIG. 20 shows a simplified illustration of the basic principle of triangulation technique allowing the determination of the distance of the finger to the sensor.

Triangulation is a trigonometric method where the emitted beam and the reflected light form a triangle. FIG. 20 shows a simplified illustration of the basic principle of triangulation technique allowing the determination of the distance D (depth) of the finger to the sensor. On FIG. 20 are represented the finger 201, the light projector 202, the optical sensor 203, the lens system 204, the relative position x of the finger on the sensor plane, and the distance D of the finger to the sensor. According to simplified triangulation theory, in first order approximation the distance D is proportional to 1/x in other terms D=a·1/x where a is a proportionality factor.

Time-of-flight (TOF) techniques determine depth distance based on the known speed of light by measuring the time it takes the light signal to fly between the light projector 132, the subject (finger, light point 135) and the light sensor 134 as shown in FIG. 13a and FIG. 13b. Various underlying mechanisms are used such as for example: Pulsed-light TOF techniques make use of pulsed SLI beams. Phase-shift or frequency-modulated TOF techniques use frequency-modulated intensity light sources. Another method for measuring distances in 3D utilizes light attenuation. Light attenuation is based upon the fact that, the farther a light beam or light pulse travels, the dimmer the reflected light is when it returns.

Stereo vision can be achieved by at least two cameras where each camera acts like one of the human eyes and receives a slightly different view of the world. Stereo vision combines the two views to perceive 3D depth. An object is projected onto different locations on the two camera images; this stereo disparity varies with object depth. Quantifying this disparity allows the determination of the 3D depth. Depth determination using stereo vision images taken from two cameras separated by a baseline distance is achieved by stereo triangulation. Note that camera calibration is a necessary step in 3D CV in order to extract metric information from 2D images.

Fingers tracking by Laser range finder: An alternative to tracking hands and fingers on natural scenes using passive or active light acquisition vision systems with CV image processing is simple active light tracking system using a laser beam (visible or invisible), steering mirrors, and a single non-imaging photo-detector, which is capable of acquiring three dimensional coordinates in real time without the need of image processing. Essentially, it is a smart range finder scanner that instead of continuously scanning over the full field of view restricts its scanning area, on the basis of a real-time analysis of the back scattered signal, to a very small surface precisely the size of the target. Finger tracking is based on the analysis of a temporal signal corresponding to the amount of back scattered light produced during a rapid, local circular scan around the fingertip. Tracking multiple fingers is possible with the same set up by tracking the fingers sequentially one after the other.

Combining CV methods for more reliable and robust finger detection and tracking: For the implementation of FFTT many independent CV approaches are capable of solving individually the problem of finger detection and tracking. What makes CV techniques even more powerful is the fact that these independent approaches can be combined to achieve even more robust and more reliable detection, tracking and identification of the fingers without compromising on the response time of the final FFTT system. In theory nothing prevents from combining or overlapping as much techniques as possible except the computational cost, however judicious choices of only few CV solutions to be combined can achieve, via optimized algorithmic synergy, very efficient and very effective detecting, tracking and identifying algorithms of the fingers. While in general dynamic filters (such as Kalman or particle filters) improve significantly the CV system performance some tested good examples of CV techniques combinations can be mentioned such as:

Colour-based finger segmentation criterion with the input of a motion-based grouping criterion, such as optical flow.

Depth information combined with colour (called RGB-D).

Articulated dynamic 3D hand model driven by integration of multiple cues including an extended optical flow constraint along with edges (silhouette) in 2D projected camera images used to capture the motion of 3D reconstruction model of hand fingers and joints.

Reliable appearance-based methods achieved by multi-cue methods (multiple visual cues such as texture, shape, colour, brightness etc.) for example: (i) methods that integrate texture and colour information and can then recognize and track fingers despite arbitrary backgrounds and; (ii) methods that integrate colour information with finger motion data. These methods can be optimized for speed with dynamic weights used to balance the blend of colour with motion data: the faster the finger moves, the more weight is given to the motion data, and slower finger movements result in the skin colour cue being weighted higher.

Detecting finger-taps with CV techniques: As described above CV offers a large spectrum of techniques that when used individually or in combination they allow FFTT to achieve the task of efficient and effective detection and tracking of multiple fingers while tapping on a surface. The use of CV techniques allows FFTT to keep track effectively of 2D or 3D locations of the fingers. The following shows that once the task of fingers locations tracking is achieved, the task of multiple finger-taps detection and tapping-fingers identification are straightforward.

Figure 11:
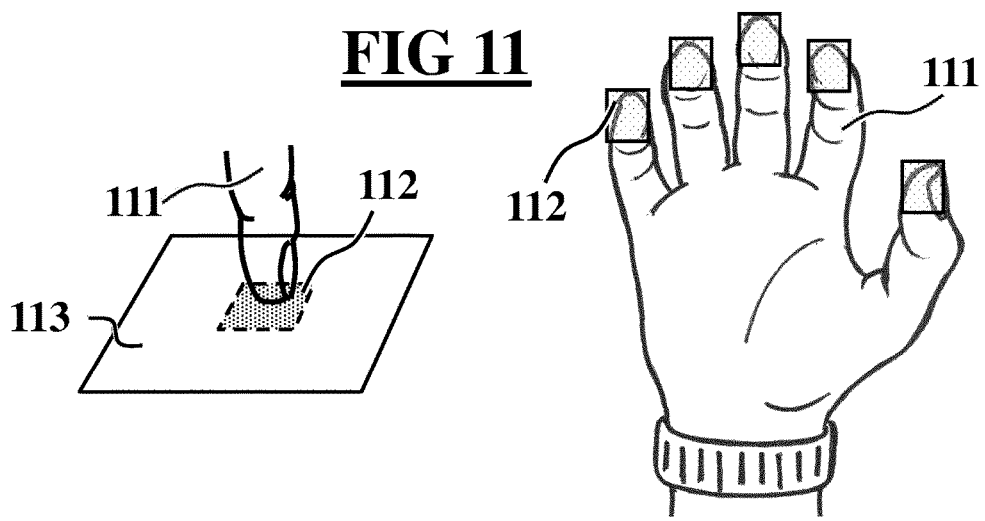
FIG. 11 shows a representation of FFTT finger-spots as a simple square areas on the tapping surface under the fingers.

FFTT finger-spots: FFTT introduces the notion of finger-spot; a finger-spot is a virtual area on the tapping surface under each finger. It is localized around the position of the finger on the tapping surface when the hand in pianist position is laying comfortably on the surface with all its fingers. FIG. 11 illustrates finger-spots as simple square areas 112 on the tapping surface 113 under the finger 111, but in fact one can intuitively imagine them as areas of a 'bean-shape' corresponding to a few cm2 and of a width more or less equal to the average distance between two fingers. A finger-spot is also defined as the area that is big enough to receive most of the taps of the concerned finger and small enough to not to receive taps from neighbouring fingers. The notion of finger-spots is important mainly for finger identification because if the finger-spot of a given finger is located then that finger is identified. As described above with the help of CV techniques FFTT tracks the fingers fn, for n=1 to 10 while tapping on the surface by monitoring their 2D or 3D locations ln, for n=1 to 10 in every frame. FFTT recognizes that a finger-tap has occurred in different ways, the main ones are: (1) the method based on reference tapping-location (location of finger-spot) and (2) finger distance to the tapping surface.

Finger-tap detection based on reference tapping-location: When the finger touches the surface its location ln coincides with the reference location kn of occurrence of the finger-tap, called reference tapping-location or finger-spot location. FFTT records the tapping locations kn, for n=1 to 10 of each finger; and each time the finger fn reaches its tapping location kn, FFTT concludes that finger fn has produced a tap. As the finger-spot locations (or reference tapping-location) of the fingers are all known, the finger fn producing the detected tap is immediately identified by its reference tapping-location kn. In order word to detect a tap and identify the finger producing it, it is sufficient to keep track of the location ln of each finger fn and recognize when it reaches (within a given tolerance e) the recorded reference tapping-location kn of the finger; in other terms when |ln−kn|<e. With ln=(x, y, z) and kn=(x0, y0, z0) a tap of finger fn is recognised if for example the following condition, based on Euclidian distance, is satisfied:

$$(x-x0)*(x-x0)+(y-y0)*(y-y0)+(z-z0)*(z-z0)<e*e.$$

The tapping location kn is recorded for every finger fn. To initialize or re-set the tapping locations kn, for example the user immobilises the 10 fingers on the tapping surface during a given laps of time in order to allow FFTT system to record as reference tapping locations kn the 2D or 3D locations ln of the fingers while immobilized on the tapping surface; i.e. kn=ln, for n=1 to 10.

Finger-tap detection based on finger distance to the a n surface: As illustrated by FIG. 1a, FIG. 1b, FIG. 2a, FIG. 2b, FIG. 4, and FIG. 5 in the case where the CV based FFTT sensing device 4 is placed on the tapping surface 2, the 3D equation S of the surface is known by construction from the geometrical shape of FFTT sensing device and the relative position of the image sensor 5 in relation to the tapping surface 2. In case the tapping surface equation S is not known by construction it can be determined by CV techniques; like for example in the case illustrated in FIG. 13a and FIG. 13b, where a Structured Light Illumination is used. The fact that the SLI covers also the tapping surface 133a and 133b, the 3D equation S of the surface is also deduced by depth measurement using appropriate mathematical algorithm based on the path length traveled by the projected lines or dots light from the projector 132 to the surface and then to the optical sensor 134. Therefore by calculating in every image frame the distance d(ln, S) of each finger location ln to the surface S, when the distance d(ln, S) is zero within a given tolerance e, i.e. when d(ln, S)<e, then a tap for finger fn is recorded as detected. In other terms with ln=(x, y, z) and kn=(x0, y0, z0) being the closest point on the surface S to the position ln of the finger fn, a tap of finger fn is recognized if for example the following condition, based on Euclidian distance, is satisfied:

$$(x-x0)*(x-x0)+(y-y0)*(y-y0)+(z-z0)*(z-z0)<e*e.$$

As in FFTT the fingers tap freely on the surface it is expected that the location where the fingers touch the surface (finger spots) are not absolutely immobile but move slightly after each tap, it is therefore necessary to update the tapping location of the finger in every frame. Therefore each time in FFTT a tap of a finger fn is detected, the reference tapping-location kn of the finger is updated by the location ln of the finger that just caused the tap; i.e. kn=ln.

Use of Touch Sensing Techniques for FFTT Implementation

Figure 6:
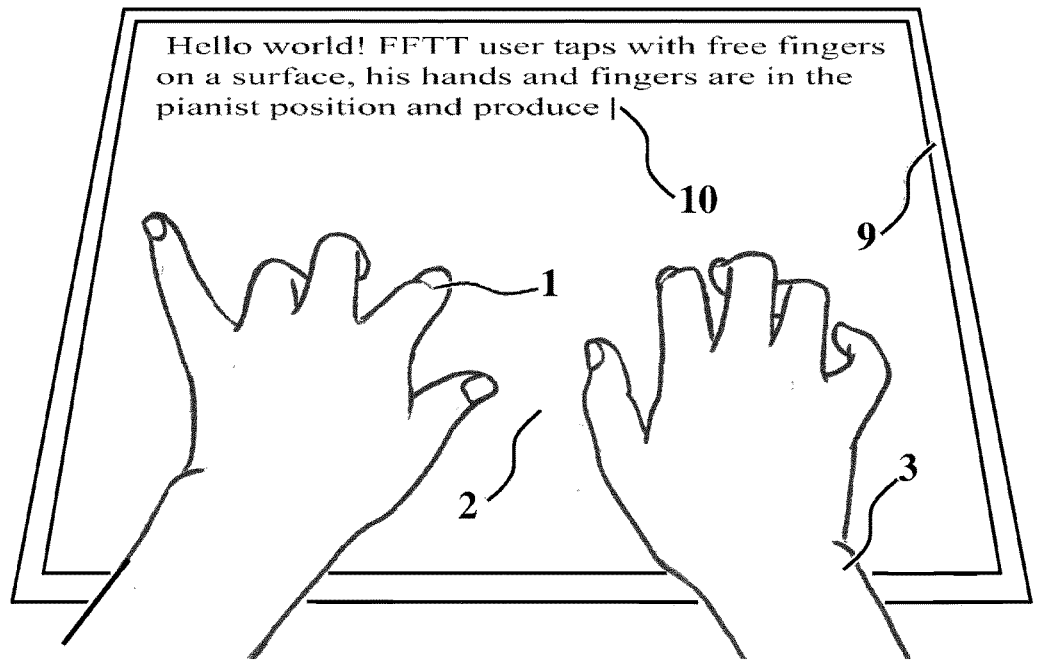
FIG. 6 shows a top view of an FFTT touch sensing surface like for example a touch screen of a computer display of an area large enough for at least two hands.
Figure 21A:
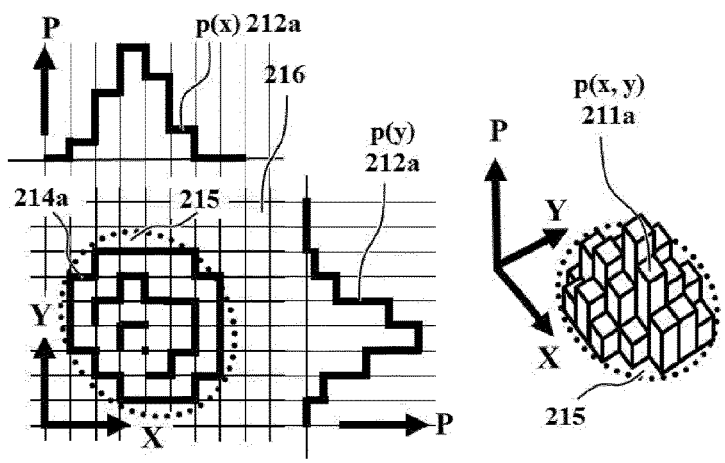
FIG. 21a, FIG. 21b and FIG. 21c illustrate 3 possible finger touch pressure distributions from 3 different FFTT touch sensing surfaces.
Figure 21B:
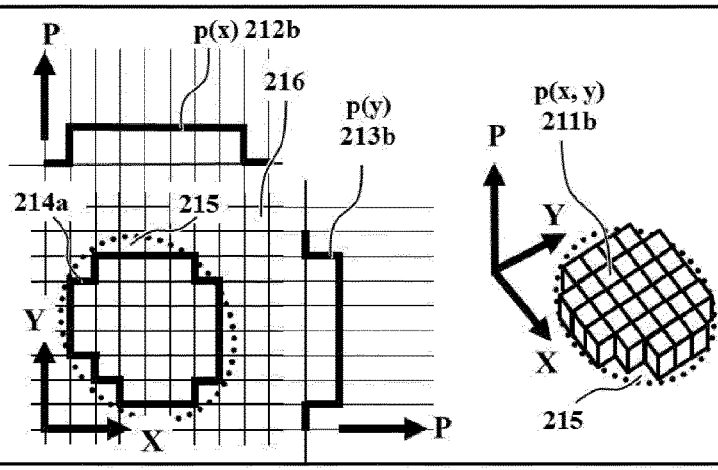
Figure 21C:
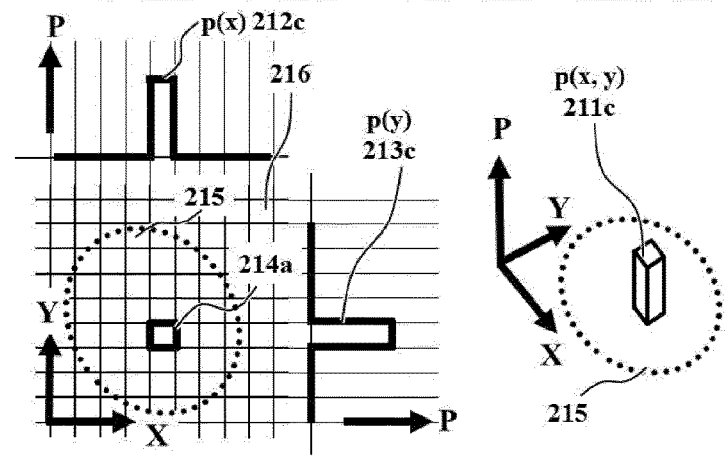

Touch (tactile or haptic) sensing surfaces such as pads, tablets, screens, displays or other surfaces that can sense multiple points of contact simultaneously are among the techniques that allow successful and effective implementation of FFTT. Such touch sensing surfaces are called FFTT touch sensing surfaces; they function on the basis of different techniques. The adjective haptic or tactile is added to indicate that the touch sensing device functions on the basis of physical contact. There are techniques that only sense the contact of the finger and others that actually measure the pressure of the finger on the surface or even the distributions of the finger pressure on the surface. For FFTT any of these techniques is suitable because what is primordial is the sensing of the tap itself; it is sufficient to have a simple yes/no detector of finger-touch characterised by two possibilities: the finger is either in contact (yes) or not in contact (no). However if the pressure measurement information is available along with the tap detection information FFTT can make use of it for further refining the user commands its offers. There are techniques based on digitizers consisting of an array of force (pressure) or touch sensing cells (sometimes called sensels) at a density of few sensels per cm and there are continuous surface sensing techniques such as surface acoustic wave techniques, infrared (IR) touch screens and others. FIG. 7a and FIG. 7b show an example of an FFTT touch sensing surface 2 of an area large enough for at least one hand. The operator's hand 3 in pianist position taps with bare and free fingers on the touch sensitive surface 2. To each tapping finger 1 corresponds an FFTT finger-spot 5. FIG. 6 shows an FFTT touch sensing surface like for example a touch screen 2 of a computer display 9 of an area large enough for at least two hands. The operator's hands 3 in pianist position tap with bare and free fingers 1 on the touch screen surface 2. The user produces succession of groups of concurrent finger-taps that are converted into text 10 appearing immediately on the display. The grid 6 in FIG. 7a represents either (1) a matrix of touch sensing cells (sensels) if the sensing surface 2 is constituted of a matrix of sensels 7 with (x, y) being their coordinates on the sensing area 2 or (2) a representation of coordinates (x, y) of points on a continuous sensing surface representing coordinates of locations where finger-touch events are sensed or measured. The data matrix p(x, y) corresponding to the touch pressure or touch sensing measured or sensed by each sensing point or cell (x, y) is collected and transferred via wired or wireless connection to FFTT processing software by an electronics device 4 of FIG. 7b at a rate high enough to detect succession of simultaneous finger-taps combinations. FIG. 21a, FIG. 21b and FIG. 21c illustrate in a simplified way 3 possible finger-touch pressure distributions p(x, y) 211a, 211b and 211c measured or sensed by each sensing cell or point 216 of 3 touch sensor surfaces based on 3 different touch sensing techniques. The finger-spot 215 corresponds in the data matrix, to the blob 211a in FIG. 21a with a non-constant pressure distribution p(x, y); to the blob 211b in FIG. 21b with a constant pressure distribution p(x, y); and to the point pressure 211c in FIG. 21c.

Capacitive touch screens operate on the basis of an array of capacitive proximity sensors where the finger and the sensor act as two plates of a capacitor. The screen includes a layer of capacitive material where the capacitors are arranged according to a coordinate system. Its circuitry can sense changes at each point across the grid; every point (x, y) on the grid generates its own signal when touched and relays that signal to an analogue to digital (A/D) controller of the system processor. This allows the touch sensor to determine the group of touch points (x, y) corresponding to the touch spot (or blob) of each finger touching the sensing surface. Since capacitance is inversely proportional to the distance between the plates, robust contact detection can be accomplished simply by selecting an appropriate threshold. The resolution of the digitizer can be enhanced beyond the physical resolution of the sensor matrix by interpolating data from neighbouring groups of sensors. The touchpad could also approximate pressure measurement by monitoring the increase in capacitance as the fingertip presses the sensor's surface.

Resistive touch screens represent a family of surface sensors that function on the principle of two conductive layers of uniform resistivity that create a uniform voltage gradient when a voltage input is applied to one side with the opposing side held at ground potential. The layers are separated by an array of small insulating dots. When the top sheet is pressed and makes contact with the bottom conductive sheet, an electrical switch is closed and a voltage level correlated to the position of the contact point is created. To establish the (x, y) position of the contact point, the voltage is alternately applied to top and bottom sheets. The voltage gradients of each sheet are oriented 90 degrees with respect to each other. The voltage drop along the vertical and horizontal axis is measured and an A/D controller converts it to identify the location coordinates (x, y) of the touch point.

Surface Acoustic Wave (SAW) touch screens are a family of surface touch sensors that work with ultrasound waves. A SAW touch sensor consists of a single layer of clear glass formed to the shape of the surface of the touch screen. Acoustic waves are emitted by Piezo-transducers across the surface of the touchscreen glass with timed bursts. Receiving sensors mounted directly atop the touchscreen glass opposite the emitters receives the acoustic wave energy traveling across the surface of the touchscreen glass. Acoustic energy captured by the receivers is transformed into analogue electrical energy and transmitted to the analogue to an A/D converter to establish a baseline voltage threshold in conjunction with pre-established signal timing. Should an energy absorbing object like a finger come in contact with the touchscreen, a small portion of acoustic energy is absorbed by the finger changing the wave energy/time parameters that the A/D controller is expecting to receive. The A/D controller interprets the changes in energy/time to identify the (x, y) location where the energy was absorbed by the touching finger from the face of the touchscreen.

Infrared (IR) touchscreens have horizontal and vertical emitters/sensors mounted on the screen edges that emit and receive IR light energy. The horizontal and vertical light paths form a light grid that, when disrupted by an object such as a finger touching the surface of the screen, allows the determination of the location (x, y) where the finger touches the screen.

Frustrated total Internal Reflection (FTIR) touch screens are capable of detecting multiple touches on a rear-projection surface. FTIR is a technique familiar to the biometrics community where it is used for fingerprint image acquisition. It acquires true touch information at high spatial and temporal resolutions providing the finger-touch blob or the group of touch points (x, y) corresponding to each finger touching the screen.

Fibre-optic strain gages touch screens is another family of contact sensors that use a succession of fibre-optic strain gages to measure pressure on multiple points of its surface for providing the finger-touch blob or the group of touch points (x, y) for each finger touching the sensor.

Finger switches are used as contact sensors; at least one switch for each finger which when touched by the finger produces an electrical signal detecting the finger contact with the surface. As illustrated in FIG. 8 these finger switches 5 placed on a surface 2 can be simple mechanical buttons, electrical switches, capacitive touch sensors or resistive touch sensors such as Force Sensitive Resistor (FSR). When used for FFTT implementation these fingers switches detect finger-taps and since there is at least one switch under each finger, the finger 1 producing the tap is identified by its corresponding touched switch 5.

How are haptic touch sensing devices used for the implementation of FFTT? For an FFTT sensing device based on tactile touch sensing techniques to be capable to help FFTT in detecting finger-taps effectively it needs to be able to assist FFTT in performing its main tasks (ref. par. [71]). Touch sensor devices can help FFTT achieve task 1 and 2; the touch sensor acquires the data related to the fingers-taps on the surface (in particular the touch pressure or the touch sensing array p(x, y)) and transfers them to FFTT data processing software. FFTT system analyses these data to identify the fingers producing the detected taps. Tasks 3, 4 and 5 are performed by FFTT processing software independently form the touch sensing device.

How does FFTT identify the fingers producing the taps on haptic touch sensing devices? FFTT sensing devices based on tactile touch sensing techniques are able to acquire at an instant t an array of data corresponding to a map of surface touch information (called touch-image) consisting of touch pressure matrix p(x, y) (also called touch-pixel matrix) corresponding to touch data at each point (x, y) of the sensor surface. Touch-pixels data arrays p(x, y) are acquired by the sensing device and transferred to FFTT processing system at a given frequency or frame rate. During a tap the finger touching the surface forms on the touch-image a spot of touch pixels called also linger touch-blob corresponding to groups of adjacent touch-pixels (x, y) with non-zero value; i.e. with p(x, y)>0. Since to each tapping finger corresponds a touch-blob in each touch-image, FFTT uses the detected touch-blob to identify the finger that produced the tap. The centroid position Zn=(Znx, Zny) of each touch-blob bn defines the tapping location kn on the sensor surface of each finger fn producing the tap, for n=1 to 10. The reference tapping location kn on the sensor surface, is recorded for every finger fn. To initialize or re-set the reference tapping locations kn, the user immobilises all the fingers on the sensor surface during a given laps of time in order to allow FFTT system to record as reference tapping locations kn the touch-blob centroids Zn of the fingers immobilized on the sensor surface; kn=Zn, for n=1 to 10. As in FFTT the fingers tap freely on the touch sensor surface it is expected that the position where the fingers touch the surface (or the locations of the corresponding touch-blobs) move slightly after each tap, it is therefore necessary to update continuously the locations (centroids) of the touch-blobs in the touch-image. Therefore each time a tap of a finger fn is detected, the reference tapping location kn of the finger is updated by the centroid Zn of the touch-blob bn of the finger just causing the tap; kn=Zn, for n=1 to 10.

Sensing the hand palm surface touch: As illustrated in FIG. 7a and FIG. 8 one advantage of touch sensors reside in the fact that they can also sense when the hand palm 8 touches the surface 2 this is quite practical because it allows FFTT to use the notion of lifted hand palm and non-lifted hand palm feature which allows, at least, to double the number of possible combinations without decreasing the ergonomics or increasing the complexity of FFTT methodology.

Use of Acoustic Sensing Techniques for FFTT Implementation

Finger-taps generate sound waves that travel by bone conduction throughout the hand. These waves are easily detected by a contact microphone placed on the hand. For example as illustrated in FIG. 22a a wrist mounted FFTT sensing device 4 comprising a microphone receives the finger-tap acoustic signals transmitted by the bones from the fingertip to the wrist. The signals are amplified, sampled, and analysed to determine what finger performed the tap; different analysis methods are available to achieve this task. As shown in FIG. 22b one method relies on the fact that for each finger the tap sound signal propagates trough specific and distinct succession of finger-bones 6. As shown in FIG. 22b and FIG. 22c each finger-bones succession 6 act as a pipe for the sound wave 7 originating from the location where the tap was produced by the corresponding finger. Therefore each finger-tap is characterised by a specific sound wave acting as signature of the finger producing the taps. The analysis of the sound response of the finger-tap allows the determination of the location of the finger-tap and the identification of the finger that produced the tap. Another method consists of training the software to recognize the sound waves specific to simultaneous finger-taps. FFTT software constitutes a database of sound-waves by tagging and recording a sufficient number of sound-waves produced by repeated taps of a same single finger tapping alone the surface as well as sound-waves produced by repeated taps of same multiple fingers of a same hand tapping simultaneously the surface. During the operation of FFTT the sound wave generated by a finger-tap or a multiple finger-taps of a hand is used to search the database for the corresponding tagged sound wave in order to determine the locations from where the finger-taps are originating and to identify the single finger or the groups of fingers of the same hand that produced the taps. For an adaptive and increasingly robust fingers identification, well-matching sound-waves are saved and used to strengthen subsequent searches in the sound wave database. In other words during normal operation FFTT software continues to strengthen its knowledge about the correlation between the sound waves emitted by the taps and the fingers producing the taps. FFTT sensing devices based on acoustic sensing techniques allow FFTT to detect multiple taps and to identify the fingers producing them; they transfer the related data to FFTT system via wired or wireless connection which allows FFTT processing software to sort the finger-taps in series of groups of concurrent finger-taps and to execute the corresponding FFTT Commands. The methods involving FFTT sensing devices based on microphones attached to the user wrist are very effective and attractive because (1) they involve rather simple and low cost technologies, (2) they constitute very efficient and robust methods to detect and identify multi-finger-taps, (3) they have small form factor and thus do not require too much computing power so as to keep battery size small and (4) wrist mounted accessories are broadly accepted and used by most people on daily basis.

FFTT Software

FFTT software package like any software program can be written in infinite ways and manners and still serve the same purpose, therefore the following section describes one possible way of developing FFTT software package. FFTT software consists of several program modules of which this description addresses only the main ones including:

User Interface (UI) modules and system setup modules;

Input/output (I/O) modules for communication with FFTT sensing devices and Information Processing Devices;

Data processing modules including algorithms used to process and analyse the data received from FFTT sensing devices. These modules depend on the underlying technology of FFTT sensing devices chosen to support FFTT.

Computer learning modules used by FFTT software to automatically learn the user specifics and establish user profiles.

User tutorials and training modules for the user to learn to use FFTT.

Computer and machine commands modules involved in executing FFTT Commands.

FFTT software architecture can be designed in modular way where each module represents one or more steps of the 5 main steps of FFTT implementation (ref. par. [71]). One remarkable design possibility consists of grouping steps 3, 4 and 5 in one module that would consist of a universal FFTT module; universal in the sense that it is independent of the technology used to support FFTT in recognizing finger-taps. Therefore this module would be the same for all FFTT sensing devices.

Figure 23:
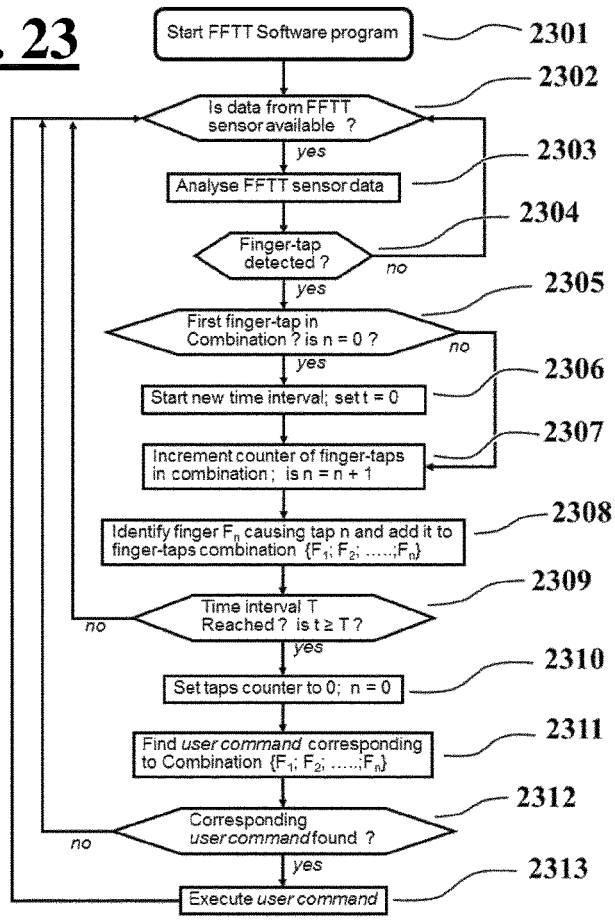
FIG. 23 shows a simplified flowchart of FFTT software program.

The general operation of FFTT software program is described by the flowchart represented in FIG. 23. Once FFTT software program is executed 2301 it starts running in events driven modes and in closed loops. In 2302 FFTT system checks if data related to finger-taps detection received from FFTT sensor are available; if yes in 2303 FFTT software analyses the data for finger-taps detection. In 2304 it checks if a finger-tap is detected, if yes it proceeds to 2305 otherwise it returns to 2302 to acquire more data from FFTT sensor. Arriving to 2305 means that a finger-tap has been recognized; in 2305 it checks if this finger-tap is the first one of the combination; for that it checks if n=0, n being the number of taps in the combination. If yes it moves to 2306 where it resets the finger-taps combination time counter t to zero; t=0, otherwise it jumps to 2307 which means that it is not the first finger-tap that is recognized for the current combination in other words n>0 and t>0. In any case in 2307 the number n of finger-taps in the combination is incremented by 1; n=m+1. In 2308 the finger Fn causing finger-tap number n is identified from the analysis of FFTT sensor data and is appended to the other fingers F1; F2; . . . ; Fn causing taps in the same combination. In 2309, FFTT system considers that all the finger-taps recognized during the time window 0<t<T belong to the same finger-taps combination so the time counter t is compared to the time interval T; and if t>=T then FFTT program considers that all the finger-taps of the same combination are now recognized and moves to 2310; otherwise it returns to 2302 to monitor the occurrence of another finger-tap. Arriving to 2310 means that a combination of concurrent finger-taps {F1; F2; . . . ; Fn} has been recognized so another combination can be started; and that is achieved by resetting to zero the counter n of finger-taps in the combination; i.e. n=0. In 2311, FFTT programme searches the tables for the FFTT Command (including for an FTLT primitive) matching the combination {F1; F2; . . . ; Fn}. In 2312 if an FFTT Command matching the concerned combination is found in the tables, the programme moves to 2313 otherwise the systems returns to 2302 to monitor the occurrence of a new combination of finger-taps. Arriving to 2313 means a corresponding FFTT Command (including an FTLT primitive) was found so it is executed by FFTT system, then the programme returns to 2302 to monitor the occurrence of a new combination of finger-taps.

FFTT software Graphical User Interface: The full version and some of the light versions of FFTT software program run on a personal computer; some of its specialized modules run on an FFTT apparatus. FFTT software operates in the background e.g. when it is executed it normally operates in hidden mode. The events driven mode of operation of FFTT program allows it to react to a variety of predefined events such as for example when the fingers are immobilized on the tapping surface for a given period of time FFTT software initializes or resets the fingers tapping locations and when it finishes doing an it informs the user by a message so that the used can start tapping to type or tapping to speak. Similarly the user can at any time reveal FFTT software Graphical User Interface (GUI) by producing a predefined event corresponding for example to a particular concurrent finger-taps combination or by immobilizing on the surface a predefined combination of fingers for a given period of time.

Figure 24:
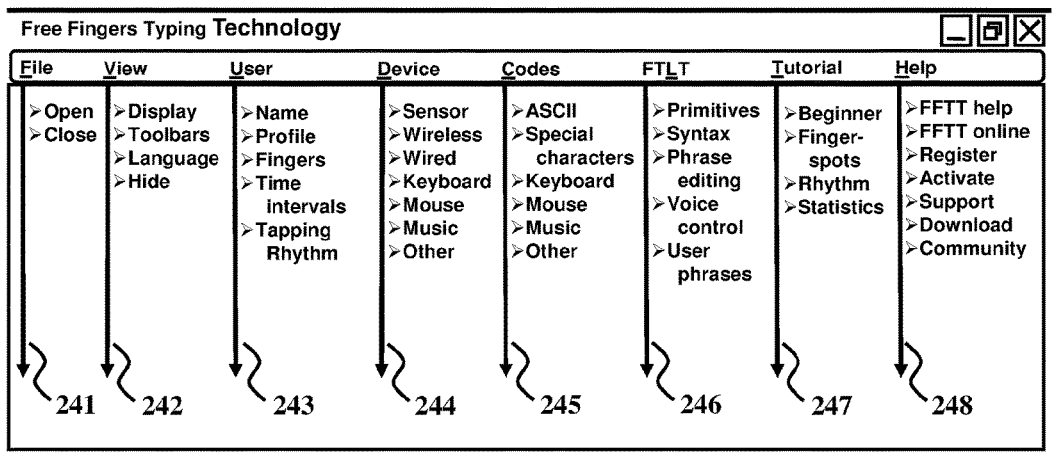
FIG. 24 shows an example of the FFTT software user interface.

FFTT software GUI allows the user to set-up FFTT system parameters and preferences. This interface module operates in interactive mode with the user through a graphic interface with user-friendly and intuitive pull-down menus. FIG. 24 shows a model example of this interface where the tabs File and View have respective pull-down menus 241 and 242 containing standard options usually available in this type of interfaces such as Open, Close, Display options, Toolbars, GUI hide option etc. . . . to tab User corresponds a pull-down menu 243 allowing the user to identify himself, review and edit his FFTT system profile and preferences, manage FFTT system knowledge of his fingers for the used FFTT sensing device technology, adjust FFTT characteristic time interval, manage FFTT system knowledge of his tapping rhythm etc. To tab Device corresponds a pull-down menu 244 allowing the user to setup and adjust FFTT sensing device parameters pertaining to the used sensor's technology, wired and wireless communication settings, setup of computer parameters such as keyboard emulation parameters, setup of pointing/selecting device such as computer mouse, definition and adjustment of data input parameters to musical instrument and other machines. To tab Codes corresponds a pull-down menu 245 allowing the user to consult and edit FFTT tables containing the codes associated to the finger-taps combinations, the tables are organized according to the type of user command they cover; ASCII characters, special characters, control characters, computer keyboard keys, user commands associated to pointing/selecting device and other commands codes. To tab FTLT corresponds a pull-down menu 246 allowing the user to access Finger taps Language technology setup and configuration functions such as FTLT primitives coding, syntax rules, composed phrases automatic editing and grammatical correction, voice control (for vocal conversion of the FTLT phrases composed by the user) and configuration of phrases style of the user. To tab Tutorial corresponds a pull-down menu 247 allowing the user to access the training and tutorial functions of the software such as the beginners training option and the option allowing at the same time FFTT system to optimize its knowledge about the user finger-spots and the user to be trained on how and where to place the fingers while tapping. Other options allow the software to optimize its knowledge about the user tapping rhythm and allow the user to learn tapping with the appropriate rhythm. There is also an option allowing the user to consult the statistics related to his/her tapping performance. To tab Help corresponds a pull-down menu 248 containing help options such as FFTT help offering a comprehensive help interface for FFTT system, FFTT online offering extended help capability via Internet, Register option for online registration, Activate option for online activation of FFTT software, Support option for obtaining online technical support on FFTT system, Download option to download online FFTT software modules, drivers and updates, access FFTT community forums, etc. . . .

FFTT software pop-up screens: FFTT software program normally running in hidden mode reacts to predefined events by pop-screens containing informative messages. For example if as illustrated in 2312 in FIG. 23 a recognized finger-taps combination does not correspond to a known FFTT Command, a warning sound is emitted or a message is displayed by the user interface module indicating that the user might have made a mistake while producing his finger-taps combination. The user needs then to repeat correctly his finger-taps of the combination he wants to produce. If this happens while the user is typing a text it might result in producing a wrong character or in skipping a character. The user might need then to execute the combination '/r3-r4' of a [BackSpace] computer keyboard key to delete the wrong character or the combination '/r2-r5' of a [Left-Arrow] to go back to the skipped character position; after what the user executes the finger-taps combination of the intended character.

FFTT Software Emulation Module for Computer Keyboard, Mouse and Other Peripherals:

Emulating computer keyboards and peripherals: FFTT software can emulate classical computer keyboard by synthesizing keystrokes, mouse motions, and button clicks. In other words when FFTT converts finger-taps combinations into ASCII codes of characters, computer keys and mouse buttons, these codes are transferred to computer applications via the same channels as those coming from a conventional keyboard or mouse or similar peripherals. The fact that FFTT software can transfer to the computer the ASCII codes associated to produced finger-tap combinations, as if they were originating from a conventional keyboard, a mouse or other is a feature that makes FFTT software fully compatible with, and requiring no modification of, the existing applications running on the computer such as word processing, email, spread sheet and so forth. In fact the software application in question is not aware whether the command originates from a conventional computer keyboard or mouse or whether it originates from FFTT system.

Mapping new FFTT Command: FFTT software allows the user to map new characters or new computer keyboard keys. In the case where a needed FFTT Command (like keyboard character, key or function or FTLT primitive) is not represented by a given combination of finger-taps, the software proposes a list of combinations of finger-taps that are not used and allows the user to select one of them to map the new FFTT Command. The new finger-taps combination and the corresponding new FFTT Command is saved in the software database.

Remapping FFTT Command: FFTT software allows the user to remap and customize existing finger-taps combinations. For example in case the user cannot execute a given finger-taps combination or prefers to assign another finger-taps combination to a given FFTT Command, the software proposes a list of combinations of finger-taps that are not used and allows the user to select one of them for replacement. The new finger-taps combination and corresponding FFTT Command are saved in the software database corresponding to that user. The software allows also the user to free a finger-taps combination, in other words the software allows the user to dissociate a given finger-taps combination from its corresponding FFTT Command.

Sending music notes to a music instrument: FFTT software allows the user to send music notes to a music instrument. It allows the user to create a table where finger-taps are associated to music notes. The speed of movement of the finger preceding the tap, the duration and possibly the pressure of the contact of the finger with the surface can be measured and exploited by FFTT system to reproduce the duration and the strength of the musical notes.

FFTT software module for FTLT: FFTT software module for Finger Taps Language Technology allows the user to consult or modify the databases for phonemes, morphemes, vocabulary, syntax and grammatical rules used by the concerned finger-taps language created on the basis of FTLT. It also allows the user to consult and modify the spelling and grammatical rules used to check for completeness and correctness the phrases composed by the user when using FTLT. In addition this module allows the user to consult and modify the parameters and the functions of the module used to convert the composed phrases to vocal speech. FFTT software module for FTLT learns the language style of the user including frequently used words and sentences. It allows the user to consult and modify the stored users' styles and profiles. FFTT software offers special training to learn to use FTLT.

FFTT software module for automatic learning and optimization of user profiles: FFTT characteristic time intervals related to the user are either set constant or adjusted automatically by FFTT program. For each user the program can be set to adjust the user's time parameters automatically in function of the speed and rhythm of tapping of the user fingers. FFTT program learns about the users' finger-taps and during operation the software continues to optimize its knowledge about the user fingers morphology and tapping pattern. If the system is used by more than one user the software maintains a database where the characteristics and the preferences of each user are stored. For different persons the hands and fingers are not morphologically identical. In addition the movement of a finger is not 100% reproducible. FFTT setup and optimization software module allows the typist to optimize the software's knowledge on the location of his finger-spots. The knowledge of FFTT software about the typist finger-spots will be further enhanced and optimized in an adaptive manner each time it is used by this user.

FFTT software module for setting up FFTT sensing device: FFTT software comprises an I/O module communicating with FFTT sensing device used mainly to setup and control FFTT sensing device. This module and the data received from FFTT sensing device depends on the type of FFTT sensing device technology selected to assist FFTT in recognizing the finger-taps.

FFTT software algorithms for finger-taps detection: FFTT software comprises a module for finger-taps detection on the basis of the data received from FFTT sensing device. This module is not visible to the user and it operates without direct interaction with the user. This module contains the algorithms required to analyse the data received from FFTT sensing device to detect the finger-taps and identify the fingers that produced them. These algorithms depend on the technology of FFTT sensing device selected to assist FFTT in detecting the finger-taps.

FFTT software tutorial and training modules: FFTT training module offers to the beginners the possibility to learn how to tap with their fingers in order to execute FFTT finger-tap combinations to produce FFTT Commands. The module proposes a succession of well-designed exercises based on graphics and sounds and provides statistics on the performance of the user. The exercises start at basic level and increase gradually the difficulties until the appropriate level is reached. FFTT software offers special training for single hand tapping and for blind people.

FFTT software installation and un-installation module: This module runs for example on a personal computer and is used to install and un-install various packages of FFTT software programs and modules such as the modules of FFTT software that are designed to run on a, personal computer, the modules of FFTT software that are designed to run on FFTT apparatus, the drivers allowing the used FFTT apparatus to communicate with the personal computer etc. . . . .

TABLE 1

| Letter | Left hand finger | Right hand finger | Code |
|---|---|---|---|
| a | l1 | r1 | l1/r1 |
| b | l1 | r2 | l1/r2 |
| c | l1 | r3 | l1/r3 |
| d | l1 | r4 | l1/r4 |
| e | l1 | r5 | l1/r5 |
| f | l2 | r1 | l2/r1 |
| g | l2 | r2 | l2/r2 |
| h | l2 | r3 | l2/r3 |
| i | l2 | r4 | l2/r4 |
| j | l2 | r5 | l2/r5 |
| k | l3 | r1 | l3/r1 |
| l | l3 | r2 | l3/r2 |
| m | l3 | r3 | l3/r3 |
| n | l3 | r4 | l3/r4 |
| o | l3 | r5 | l3/r5 |
| p | l4 | r1 | l4/r1 |
| q | l4 | r2 | l4/r2 |
| r | l4 | r3 | l4/r3 |
| s | l4 | r4 | l4/r4 |
| t | l4 | r5 | l4/r5 |
| u | l5 | r1 | l5/r1 |
| v | l5 | r2 | l5/r2 |
| w | l5 | r3 | l5/r3 |
| x | l5 | r4 | l5/r4 |
| y | l5 | r5 | l5/r5 |
| z | — | r1-r5 | /r1-r5 |

TABLE 2

| Letters | Left hand finger | Right hand fingers |
|---|---|---|
| a, b, c, d, e | l1 | r1, r2, r3, r4, r5 |
| f, g, h, i, j | l2 | r1, r2, r3, r4, r5 |
| k, l, m, n, o | l3 | r1, r2, r3, r4, r5 |
| p, q, r, s, t | l4 | r1, r2, r3, r4, r5 |
| u, v, w, x, y | l5 | r1, r2, r3, r4, r5 |
| z | — | r1-r5 |

TABLE 3

| Number | Left hand finger | Right hand finger | Code |
|---|---|---|---|
| 1 | l1 | — | l1/ |
| 2 | l2 | — | l2/ |
| 3 | l3 | — | l3/ |
| 4 | l4 | — | l4/ |
| 5 | l5 | — | l5/ |
| 6 | — | r5 | /r5 |
| 7 | — | r4 | /r4 |

TABLE 3-continued

| Number | Left hand finger | Right hand finger | Code |
|---|---|---|---|
| 8 | — | r3 | /r3 |
| 9 | — | r2 | /r2 |
| 0 | — | r1 | /r1 |

TABLE 4

| Character | Left hand fingers | Right hand fingers | Code |
|---|---|---|---|
| . | l1-l3 | — | l1-l3/ |
| + | l1-l5 | — | l1-l5/ |
| = | l2-l4 | — | l2-l4/ |
| ; | — | r2-r4 | /r2-r4 |
| : | — | r2-r5 | /r2-r5 |
| , | — | r1-r4 | /r1-r4 |

TABLE 5

| Character | Left hand fingers | Right hand fingers | Code |
|---|---|---|---|
| [Shift] | l3-l4 | — | l3-l4/ |
| [CapsLock] | l4-l5 | — | l4-l5/ |
| [Alt] | l1-l2 | — | l1-l2/ |
| [Ctrl] | l2-l3 | — | l2-l3/ |
| [BackSpace] | — | r3-r4 | /r3-r4 |
| [Enter] | — | r2-r3 | /r2-r3 |
| [Space] | — | r4-r5 | /r4-r5 |
| [Esc] | — | r2-r1 | /r2-r1 |

TABLE 6

| Character | Left hand fingers | Right hand fingers | Code |
|---|---|---|---|
| ! | l1 | r1-r2 | l1/r1-r2 |
| — | l1 | r2-r3 | l1/r2-r3 |
| # | l1 | r3-r4 | l1/r3-r4 |
| $ | l1 | r4-r5 | l1/r4-r5 |
| % | l1 | r2-r4 | l1/r2-r4 |
| & | l1 | r1-r3 | l1/r2-r3 |
| ( | l1 | r1-r4 | l1/r1-r4 |
| ) | l1 | r2-r4 | l1/r2-r4 |
| * | l2 | r2-r3 | l2/r2-r3 |
| < | l2 | r3-r4 | l2/r3-r4 |
| > | l2 | r4-r5 | l2/r4-r5 |
| ? | l2 | r2-r4 | l2/r2-r4 |
| @ | l2 | r3-r5 | l2/r3-r5 |
| [ | l2 | r1-r4 | l2/r1-r4 |
| ] | l2 | r2-r5 | l2/r2-r5 |
| \ | l3 | r1-r2 | l3/r1-r2 |
| / | l3 | r2-r3 | l3/r2-r3 |
| ^ | l3 | r3-r4 | l3/r3-r4 |
| - | l3 | r4-r5 | l3/r4-r5 |
| ' | l3 | r2-r4 | l3/r2-r4 |
| " | l3 | r3-r5 | l3/r3-r5 |
| { | l3 | r1-r4 | l3/r1-r4 |
| } | l3 | r2-r5 | l3/r2-r5 |
| \| | l4 | r1-r2 | l4/r1-r2 |
| ~ | l4 | r2-r3 | l4/r2-r3 |
| € | l4 | r3-r4 | l4/r3-r4 |
| £ | l4 | r4-r5 | l4/r4-r5 |
| ¥ | l4 | r2-r4 | l4/r2-r4 |

TABLE 7

| Character | Left hand fingers | Right hand fingers | Code |
|---|---|---|---|
| [RtArr] | l5 | r1-r2 | l5/r1-r2 |
| [End] | l5 | r2-r3 | l5/r2-r3 |
| [LtArr] | l5 | r3-r4 | l5/r3-r4 |
| [Home] | l5 | r4-r5 | l5/r4-r5 |
| [UpArr] | l5 | r2-r4 | l5/r2-r4 |
| [DnArr] | l5 | r3-r5 | l5/r3-r5 |
| [PgDn] | l5 | r1-r4 | l5/r1-r4 |
| [PgUp] | l5 | r2-r5 | l5/r2-r5 |
| [Del] | l1-l2 | r1 | l1-l2/r1 |
| [Pause] | l1-l2 | r2 | l1-l2/r2 |
| [Break] | l1-l2 | r3 | l1-l2/r3 |
| [PrtSc] | l1-l2 | r4 | l1-l2/r4 |
| [AltGr] | l1-l2 | r5 | l1-l2/r5 |
| [Nlock] | l2-l3 | r5 | l2-l3/r5 |
| [Ins] | l2-l3 | r2 | l2-l3/r2 |
| [Scr] | l2-l3 | r3 | l2-l3/r3 |
| [SysRq] | l2-l3 | r4 | l2-l3/r4 |
| [Tab] | l2-l3 | r5 | l2-l3/r5 |

The invention claimed is:

1. A method for producing finger sign languages, wherein said method is based on associating linguistic phonemes and morphemes with specific fingers and wherein said method comprises:
    producing taps with the fingers on a surface wherein a tap is a time event of one or more fingers entering in contact with a surface,
    detecting said fingers taps on said surface based on the time event of specific fingers entering simultaneously in contact with the surface,
    identifying said specific fingers, and
    producing on an information processing device a sign language corresponding to said linguistic phonemes and morphemes associated to said specific fingers.

2. The method of claim 1 wherein finger-taps are sorted by: considering that all finger-taps detected during a same time interval T belong to a same group of said concurrent finger-taps; and considering that two successive groups of concurrent finger-taps are separated by a time interval U.

3. The method of claim 1 wherein a finger-tap is characterized by: a time when the finger enters in contact with the surface; a time when the finger leaves the surface; and a location of occurrence of said finger-tap.

4. The method of claim 1 wherein a speed of movement of the finger preceding the tap and a duration of the contact of the finger with the surface are measured and exploited for producing linguistic phonemes and morphemes.

5. The method of claim 1 wherein said information processing device includes one or more of computer, personal digital assistant, cellular phone, photo/video camera, gaming device, musical equipment, and other computer based device as well as, other keyboard based device and pointer/selector based device.

6. The method of claim 1 wherein said linguistic phonemes and morphemes are assigned to said combinations of fingers by: assigning codes to said combinations of fingers; and assigning linguistic phonemes and morphemes to said codes.

7. The method according to claim 6 wherein said codes are created according to a coding scheme.

8. The method of claim 1, wherein said phonemes and morphemes are converted to speech.

9. An information processing device for producing sign language based on associating linguistic phonemes and morphemes with specific fingers comprising:

detecting means for detecting fingers taps on a surface based on a time event of specific fingers entering simultaneously in contact with the surface, identifying means for identifying said specific fingers, and producing means for producing a sign language corresponding to said linguistic phonemes and morphemes associated to said specific fingers.

10. The information processing device of claim 9 wherein information based on said linguistic phonemes and morphemes is processed locally or sent via wired or wireless connection to another information processing device.

11. A non-transitory machine-readable medium having executable instructions to cause one or more processing units to perform the steps of:

detecting fingers taps on a surface based on a time event of specific fingers entering simultaneously in contact with the surface, identifying said specific fingers, and producing on an information processing device a sign language corresponding to said linguistic phonemes and morphemes associated to said specific fingers.

12. An information processing device for producing speech from sign language based on associating linguistic phonemes and morphemes with specific fingers comprising:

detecting means for detecting fingers taps on a surface based on a time event of specific fingers entering simultaneously in contact with the surface, identifying means for identifying said specific fingers, producing means for producing a sign language corresponding to said linguistic phonemes and morphemes associated to said specific fingers, converting means for converting the phonemes and morphemes into speech, and outputting means for outputting the speech.

* * * * *